US012750267B2

(12) United States Patent
Shrestha et al.

(10) Patent No.: US 12,750,267 B2
(45) Date of Patent: Sep. 29, 2026

(54) SYSTEM FRAME NUMBER CONFIGURATION

(71) Applicant: QUALCOMM Incorporated, San Diego, CA (US)

(72) Inventors: Bharat Shrestha, San Diego, CA (US); Ayan Sengupta, San Diego, CA (US); Alberto Rico Alvarino, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 19/041,737

(22) Filed: Jan. 30, 2025

(65) Prior Publication Data

US 2026/0222268 A1 Jul. 30, 2026

(51) Int. Cl.
*H04L 27/26* (2006.01)
*H04L 5/14* (2006.01)
*H04W 76/28* (2018.01)

(52) U.S. Cl.
CPC ............ *H04L 27/2656* (2013.01); *H04L 5/14* (2013.01); *H04W 76/28* (2018.02)

(58) Field of Classification Search
CPC ....... H04L 27/2656; H04L 5/14; H04W 76/28
See application file for complete search history.

(56) References Cited

U.S. PATENT DOCUMENTS

| | | | |
|---|---|---|---|
| 12,501,514 B2 * | 12/2025 | Khoshkholgh Dashtaki ............... | H04W 76/28 |
| 12,574,896 B2 * | 3/2026 | Sogabe ............. | H04W 52/0216 |
| 2021/0091891 A1 * | 3/2021 | Phan ...................... | H04B 1/713 |
| 2024/0049114 A1 | 2/2024 | Palle Venkata et al. | |
| 2026/0059607 A1 * | 2/2026 | Pradas .................. | H04W 76/28 |

FOREIGN PATENT DOCUMENTS

| | | |
|---|---|---|
| CN | 117882467 A | 4/2024 |
| WO | 2023151030 A1 | 8/2023 |

OTHER PUBLICATIONS

International Search Report and Written Opinion—PCT/US2025/059216—ISA/EPO—Apr. 1, 2026.

* cited by examiner

*Primary Examiner* — Dac V Ha
(74) *Attorney, Agent, or Firm* — Harriy & Harrity LLP

(57) ABSTRACT

Various aspects of the present disclosure generally relate to wireless communication. Some aspects more specifically relate to system frame number configurations. In some aspects, a network node may transmit, and a UE may receive, configuration information that indicates to in accordance with a frame periodicity of ninety milliseconds and in accordance with a quantity of system frame numbers that is a multiple of nine and that is less than one thousand and twenty-four. In some aspects, the configuration information may indicate that the quantity of system frame numbers is to be used in connection with narrowband Internet of Things (IoT) non-terrestrial network node (NTN) time-division duplexing (TDD) communications. Numerous other aspects are described.

20 Claims, 8 Drawing Sheets

SYSTEM FRAME NUMBER CONFIGURATION

FIELD OF THE DISCLOSURE

Aspects of the present disclosure generally relate to wireless communication and specifically relate to techniques, apparatuses, and methods associated with system frame number configurations.

BACKGROUND

Wireless communication systems are widely deployed to provide various services, which may involve carrying or supporting voice, text, other messaging, video, data, or other traffic. Typical wireless communication systems may employ multiple-access radio access technologies (RATs) capable of supporting communication among multiple wireless communication devices including user devices or other devices by sharing the available system resources (for example, time domain resources, frequency domain resources, spatial domain resources, or device transmit power, among other examples). Such multiple-access RATs are supported by technological advancements that have been adopted in various telecommunication standards, which define common protocols that enable different wireless communication devices to communicate on a local, municipal, national, regional, or global level.

An example telecommunication standard is New Radio (NR). NR, which may also be referred to as 5G, is part of a continuous mobile broadband evolution promulgated by the Third Generation Partnership Project (3GPP). NR (and other RATs beyond NR) may be designed to better support enhanced mobile broadband (eMBB) access, Internet of things (IoT) networks or reduced capability device deployments, and ultra-reliable low latency communication (URLLC) applications. To support these verticals, NR systems may be designed to implement a modularized functional infrastructure, a disaggregated and service-based network architecture, network function virtualization, network slicing, multi-access edge computing, millimeter wave (mmWave) technologies including massive multiple-input multiple-output (MIMO), licensed and unlicensed spectrum access, non-terrestrial network (NTN) deployments, sidelink and other device-to-device direct communication technologies (for example, cellular vehicle-to-everything (CV2X) communication), multiple-subscriber implementations, high-precision positioning, or radio frequency (RF) sensing, among other examples. As the demand for connectivity continues to increase, further improvements in NR may be implemented, and other RATs, such as 6G and beyond, may be introduced to enable new applications and facilitate new use cases.

A system frame number (SFN) is a counter used in wireless communication systems for tracking and organizing radio frames. The SFN may provide a unique identifier for each radio frame of a communication and may be used to improve synchronization between two or more devices. In some examples, the SFN may be configured with a range of values from 0 to 1023, thereby representing a total of 1024 radio frames in a sequence. Each radio frame typically has a duration of 10 milliseconds (ms). A hyper system frame number (H-SFN) is an extended frame counter used in conjunction with the SFN to provide a larger time reference. An H-SFN may be utilized in long-term synchronization tasks or for network operations that require a time reference beyond the range of the SFN.

SUMMARY

Some aspects described herein relate to a method for wireless communication by a user equipment (UE). The method may include receiving configuration information that indicates to communicate in accordance with a frame periodicity of ninety milliseconds and in accordance with a quantity of system frame numbers that is a multiple of nine and that is less than one thousand and twenty-four. The method may include communicating in accordance with the configuration information.

Some aspects described herein relate to a method for wireless communication by a network node. The method may include transmitting, to a UE, configuration information that indicates to communicate in accordance with a frame periodicity of ninety milliseconds and in accordance with a quantity of system frame numbers that is a multiple of nine and that is less than one thousand and twenty-four. The method may include communicating in accordance with the configuration information.

Some aspects described herein relate to a UE for wireless communication. The UE may include a processing system. The processing system may include one or more processors and one or more code-storing memories coupled with the one or more processors. The processing system may be configured to cause the UE to receive configuration information that indicates to communicate in accordance with a frame periodicity of ninety milliseconds and in accordance with a quantity of system frame numbers that is a multiple of nine and that is less than one thousand and twenty-four. The processing system may be configured to cause the UE to communicate in accordance with the configuration information.

Some aspects described herein relate to a network node for wireless communication. The network node may include a processing system. The processing system may include one or more processors and one or more code-storing memories coupled with the one or more processors. The processing system may be configured to cause the UE to transmit, to a UE, configuration information that indicates to communicate in accordance with a frame periodicity of ninety milliseconds and in accordance with a quantity of system frame numbers that is a multiple of nine and that is less than one thousand and twenty-four. The processing system may be configured to cause the UE to communicate in accordance with the configuration information.

Some aspects described herein relate to a non-transitory computer-readable medium that stores a set of instructions for wireless communication by a UE. The set of instructions, when executed by one or more processors of the UE, may cause the UE to receive configuration information that indicates to communicate in accordance with a frame periodicity of ninety milliseconds and in accordance with a quantity of system frame numbers that is a multiple of nine and that is less than one thousand and twenty-four. The set of instructions, when executed by one or more processors of the UE, may cause the UE to communicate in accordance with the configuration information.

Some aspects described herein relate to a non-transitory computer-readable medium that stores a set of instructions for wireless communication by a network node. The set of instructions, when executed by one or more processors of the network node, may cause the network node to transmit, to a UE, configuration information that indicates to communicate in accordance with a frame periodicity of ninety milliseconds and in accordance with a quantity of system frame numbers that is a multiple of nine and that is less than one thousand and twenty-four. The set of instructions, when executed by one or more processors of the network node, may cause the network node to communicate in accordance with the configuration information.

Some aspects described herein relate to an apparatus for wireless communication. The apparatus may include means for receiving configuration information that indicates to communicate in accordance with a frame periodicity of ninety milliseconds and in accordance with a quantity of system frame numbers that is a multiple of nine and that is less than one thousand and twenty-four. The apparatus may include means for communicating in accordance with the configuration information.

Some aspects described herein relate to an apparatus for wireless communication. The apparatus may include means for transmitting, to a UE, configuration information that indicates to communicate in accordance with a frame periodicity of ninety milliseconds and in accordance with a quantity of system frame numbers that is a multiple of nine and that is less than one thousand and twenty-four. The apparatus may include means for communicating in accordance with the configuration information.

Aspects of the present disclosure may generally be implemented by or as a method, apparatus, system, computer program product, non-transitory computer-readable medium, user equipment, base station, network node, network entity, wireless communication device, or processing system as substantially described with reference to, and as illustrated by, this specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

DETAILED DESCRIPTION

Figure 1:
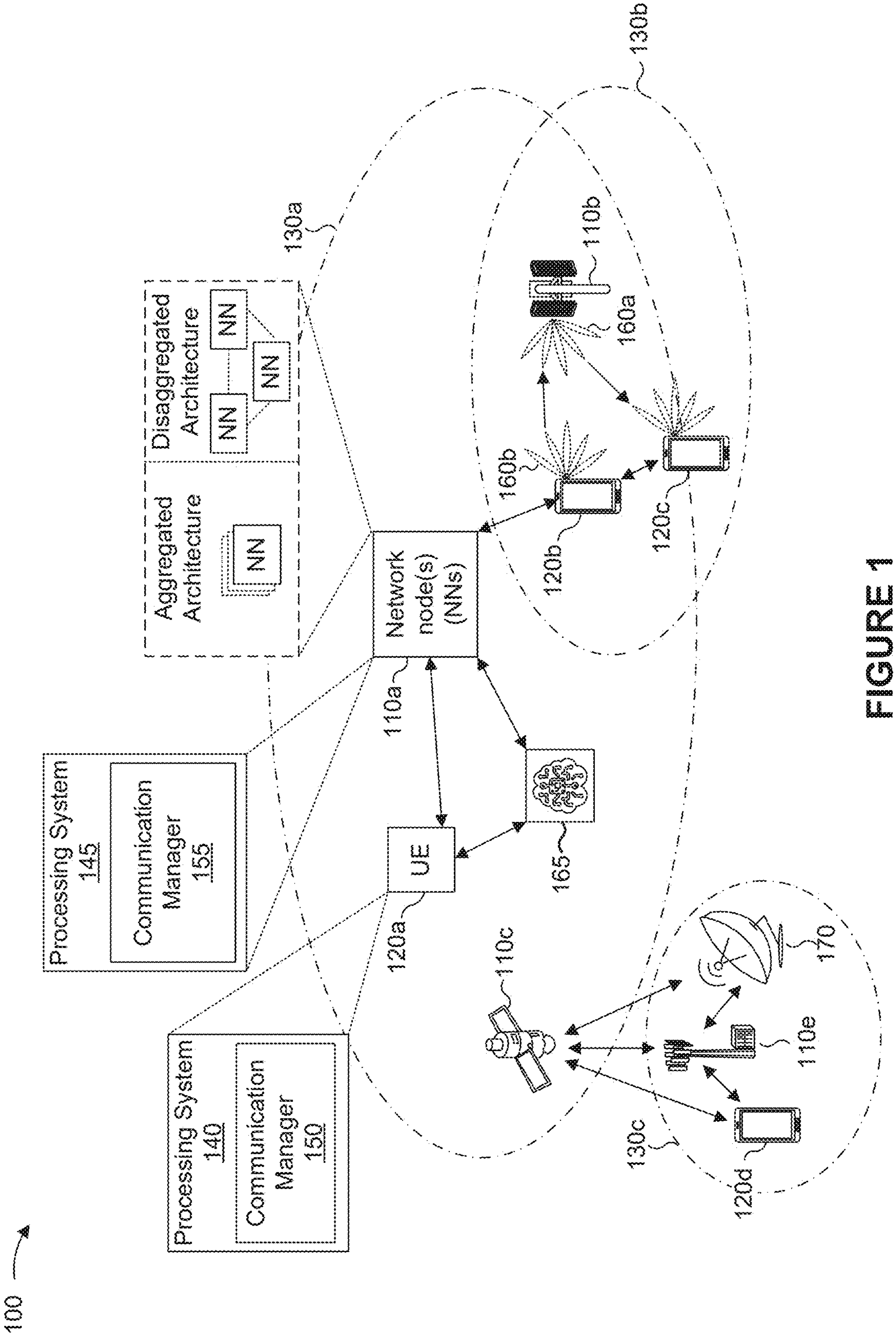
FIG. 1 is a diagram illustrating an example of a wireless communication network.

Various aspects of the present disclosure are described hereinafter with reference to the accompanying drawings. However, aspects of the present disclosure may be embodied in many different forms. The present disclosure is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures or functionalities in addition to or other than the structures or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

A non-terrestrial network (NTN) is a communication network that includes one or more components located above the surface of the earth, such as a satellite, to provide connectivity for one or more terrestrial devices, such as a user equipment (UE). Unlike traditional cellular networks where network nodes are located on the ground, non-terrestrial networks may use NTN nodes (or a combination of NTN nodes and terrestrial nodes) as connection points. This may allow the NTN to provide coverage in remote areas where building ground infrastructure would be impractical or impossible.

The Internet of Things (IoT) refers to a network of physical devices equipped with sensors or software that enables devices (IoT devices) to collect, transmit, and receive data. In wireless communications, IoT devices may transmit small amounts of data periodically and may operate on limited power. Some examples of IoT devices include smart meters, agricultural sensors, and tracking devices. Time division duplexing (TDD) is a process for two-way communications on a single frequency channel. A TDD system may rapidly switch between uplink (UE to network node) and downlink (network node to UE) in a coordinated pattern to reduce or eliminate interference. In contrast, frequency division duplexing (FDD) uses two separate frequency channels for uplink and downlink communications. This may allow for continuous transmission in both directions, but may require the allocation of more spectrum resources. A narrowband (NB)-IoT NTN TDD communication mode may combine these concepts into a specialized system for IoT devices communicating through satellites using TDD. This communication mode may be used to reduce the challenges of satellite communications (such as signal delay and limited power) while efficiently supporting the need for IoT devices to perform periodic, small data transmissions.

A frame structure for an NB-IoT TDD cell (for example, operating in a mobile satellite service (MSS) band) may have periodicity of 90 milliseconds (ms). The frame structure may include a simplex slot. A simplex slot refers to a time interval assigned within a communication channel for unidirectional data transmission. In some examples, the simplex slot may be used for downlink communications only, such as for ring and messaging channels. Additionally, the frame structure may include a plurality of uplink (UL) slots and a plurality of downlink (DL) slots, such as four uplink slots followed by four downlink slots. In some examples, the simplex slot may have a duration of 20.32 ms, each uplink slot may have a duration of 8.28 ms, and each downlink slot may have a duration of 8.28 ms. Therefore, the frame structure that includes the single simplex slot, the four uplink slots, and the four downlink slots may have a duration of 90 ms.

A system frame number (SFN) is a counter used in wireless communication systems for tracking and organizing radio frames. The SFN may provide a unique identifier for each radio frame of a communication and may be used to improve synchronization between two or more devices. A hyper system frame number (H-SFN) is an extended frame counter used in conjunction with the SFN to provide a larger time reference. An H-SFN may be utilized in long-term synchronization tasks or for network operations that require a time reference beyond the range of the SFN. In some examples, the H-SFN may be configured with a range of values from 0 to 1023, thereby representing a total of 1024 radio frames in a sequence. Each radio frame may have a duration of 10 ms, and therefore, the H-SFN may wrap around (e.g., reset to zero) every 1024 frames.

As described herein, a frame duration for NB-IoT TDD cell communications may be 90 ms. Since each H-SFN has a duration of 10 ms, the frame may be spread over nine SFNs. However, as also described herein, an H-SFN may be configured with values from 0 to 1023, thereby wrapping around after 1024 H-SFNs. NB-IoT communications may use the SFN and H-SFN for random access (RA) radio network temporary identifier (RNTI) (RA-RNTI) processes, system information block (SIB) scheduling, preconfigured uplink resource (PUR) determination, discontinuous reception (DRX) (such as enhanced DRX (eDRX)) communications, single-cell point-to-multipoint (SC-PTM) communications, and multicast control channel (MCCH) communications. However, 1024 H-SFNs (which corresponds to 1,048,576 SFNs) is not divisible by nine. Therefore, when the H-SFN counter reaches 1023 (the end of the counter) and wraps around (resets to 0), the wrap-around point may occur in the middle of a frame. This may result in synchronization issues between the UE and the network node. For example, if a communication pattern is broken at the wrap-around point, a device may attempt to transmit during a reception period, or may attempt to receive during a transmission period, thereby resulting in missed or dropped communications between the UE and the network node. Additionally, this misalignment between the frame periodicity (90 ms) and wrap-around point (1024 H-SFN) may negatively impact resource scheduling. For example, when a transmission schedule does not align with a total SFN count, scheduling transmissions near the wrap-around point may become more complicated, thereby increasing computational overhead and system complexity. Further, the misalignment between the frame periodicity and the wrap-around point may negatively impact procedures that rely on consistent frame patterns, such as broadcast channel scheduling, system information updates, paging procedures, random access opportunities, and power saving modes, among other examples.

Various aspects generally relate to wireless communications. Some aspects more specifically relate to SFN configurations. In some aspects, a network node may transmit, and a UE may receive, configuration information that indicates to communicate in accordance with a frame periodicity of 90 ms and in accordance with a quantity of system frame numbers that is a multiple of 9 and that is less than 1024. In some aspects, the configuration information may indicate that the quantity of system frame numbers is to be used in connection with NB IoT NTN TDD communications. In some aspects, the configuration information may be included in a system information block (SIB), such as a system information block one (SIB1). For example, the network node may broadcast a SIB1 that includes the configuration information, and the UE may receive the SIB1 via the broadcast message from the network node. The configuration information may improve a likelihood of the frame periodicity aligning with a wrap-around point of a total quantity of H-SFNs. In one example, the total quantity of H-SFNs may be 990 (ranging from 0 to 989), which is a multiple of 9 and is less than 1024. Therefore, when the H-SFN counter wraps around (from 989 back to 0), the alignment of the wrap-around point aligns with a beginning of the frame. In some aspects, the configuration information may also indicate that system information (SI) communications, multicast control channel (MCC) communications, or preconfigured uplink resource (PUR) communications are to be scheduled in accordance with the quantity of system frame numbers. For example, the configuration information may indicate that the SI communications, the MCC communications, or the PUR communications are to be in accordance with a multiple of three H-SFNs or in accordance with a multiple of five H-SFNs.

Particular aspects of the subject matter described in this disclosure can be implemented to realize one or more of the following potential advantages. In some examples, by enabling communication of the configuration information that indicates to communicate in accordance with a frame periodicity of 90 milliseconds and in accordance with a quantity of system frame numbers that is a multiple of 9 and that is less than 1024, the described techniques can be used to improve synchronization between the UE and the network node. For example, by enabling the communication of the configuration information, the described techniques can be used to increase a likelihood of a frame repetition occurring at a wrap-around point of the system frame numbers. Conversely, by enabling the communication of the configuration information, the described techniques can be used to reduce a likelihood of a system frame number wrap-around occurring in the middle of a frame. Additionally, by enabling communication of the configuration information, the described techniques can be used to decrease a likelihood of the UE attempting to transmit in a downlink frame or attempting to receive in an uplink frame, thereby reducing a likelihood of missed or dropped communications. In some examples, by enabling the communication of the configuration information, the described techniques can be used to improve resource scheduling between the UE and the network node. In some examples, by enabling the communication of the configuration information, the described techniques can be used to reduce computation overhead and system complexity, for example, by increasing a likelihood that the frame periodicity and the wrap-around point of the system frame numbers are aligned. In some examples, by enabling the communication of the configuration information, the described techniques can be used to improve one or more processes that rely on consistent frame patterns, such as broadcast channel scheduling, system information updates, paging procedures, random access opportunities, and power saving modes, among other examples. These example advantages, among others, are described in more detail below.

As described above, wireless communication systems may be deployed to provide various services, which may involve carrying or supporting voice, text, other messaging, video, data, or other traffic. Some wireless communications systems may employ multiple-access radio access technologies (RATs). The multiple-access RATs may be capable of supporting communication with multiple wireless communication devices by sharing the available system resources (for example, time domain resources, frequency domain resources, spatial domain resources, or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

Multiple-access RATs are supported by technological advancements that have been adopted in various telecommunication standards, which define common protocols that enable wireless communication devices to communicate on a local, municipal, enterprise, national, regional, or global level. For example, 5G New Radio (NR) is part of a continuous mobile broadband evolution promulgated by the Third Generation Partnership Project (3GPP). 5G NR may support enhanced mobile broadband (eMBB) access, Internet of Things (IoT) networks or reduced capability (RedCap) device deployments, ultra-reliable low-latency communication (URLLC) applications, or massive machine-type communication (mMTC), among other examples.

To support these and other target verticals, a wireless communication system may be designed to implement a modularized functional infrastructure, a disaggregated and service-based network architecture, network function virtualization, network slicing, multi-access edge computing, millimeter wave (mmWave) technologies including massive multiple-input multiple-output (MIMO), beamforming, IoT device or RedCap device connectivity and management, industrial connectivity, licensed and unlicensed spectrum access, sidelink and other device-to-device direct communication (for example, cellular vehicle-to-everything (CV2X) communication), frequency spectrum expansion, overlapping spectrum use, small cell deployments, NTN deployments, device aggregation, advanced duplex communication (for example, sub-band full-duplex (SBFD)), multiple-subscriber implementations, high-precision positioning, radio frequency (RF) sensing, network energy savings (NES), low-power signaling and radios, or artificial intelligence or machine learning (AI/ML), among other examples.

As indicated above, a network node 110 may be a terrestrial network node 110 (for example, a terrestrial base station or entity of a disaggregated base station) or an NTN network node 110. In the example shown in FIG. 1, the network node 110*c* may be an NTN network node 110 and the cell 130*c* may be an NTN cell. For example, the wireless communication network 100 may include one or more NTN deployments including an NTN network node 110 or a relay station. In some examples, a relay station in an NTN deployment may be referred to as a "non-terrestrial relay station." An NTN may facilitate access to the wireless communication network 100 for remote areas that may not otherwise be within a coverage area of a terrestrial network node 110, such as over water or remote areas in which a terrestrial network is not deployed. An NTN may provide connectivity for various applications, including satellite communications, IoT, MTC, or other applications. An NTN network node 110 may include a satellite, a manned aircraft system, or an unmanned aircraft system (UAS) platform, among other examples. A satellite may include a low-earth orbit (LEO) satellite, a medium-earth orbit (MEO) satellite, a geostationary earth orbit (GEO) satellite, or a high elliptical orbit (HEO) satellite, among other examples. A manned aircraft system may include an airplane, a helicopter, or a dirigible, among other examples. A UAS platform may include a high-altitude platform station (HAPS), a balloon, a dirigible, or an airplane, among other examples.

An NTN network node 110 may communicate directly or indirectly with other entities in the wireless communication network 100 using NTN communication. The other entities may include UEs 120, other NTN network nodes 110 in the one or more NTN deployments, other types of network nodes 110 (for example, stationary, terrestrial, or ground-based network nodes, such as the network node 110*e*), relay stations, or one or more components or devices included in or coupled with a core network of the wireless communication network 100. For example, an NTN network node 110 may communicate with a UE 120 via a service link (for example, where the service link includes an access link). Additionally or alternatively, an NTN network node 110 may communicate with a gateway 170 (for example, a terrestrial node providing connectivity for the NTN network node 110 to a data network or a core network) via a feeder link (for example, where the feeder link is associated with an N2 or an N3 interface). Additionally or alternatively, NTN network nodes 110 may communicate directly with one another via an inter-satellite link (ISL). In some examples, an NTN deployment may be transparent (for example, where the NTN network node 110 operates in a similar manner as a repeater or relay or where an access link does not terminate at the NTN network node 110). In some other examples, an NTN deployment may be regenerative. For example, an access link may terminate at the NTN network node 110, and the NTN network node 110 may regenerate a signal (such as by performing signal processing or enhancement, which may include error correction, modulation or demodulation, or amplification).

The foregoing and other technological improvements may support use cases, such as wireless fronthauls, wireless midhauls, wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial or aerial platforms, among other examples.

As the demand for connectivity continues to increase, further improvements in NR may be implemented, and other RATs, such as 6G and beyond, may be introduced to enable new applications and facilitate new use cases. The methods, operations, apparatuses, and techniques described herein may enable one or more of the foregoing technologies or new technologies or support one or more of the foregoing use cases or new use cases.

FIG. 1 is a diagram illustrating an example of a wireless communication network 100. The wireless communication network 100 may be or may include elements of a 5G (or NR) network or a 6G network, among other examples. The wireless communication network 100 may include multiple network nodes 110. For example, in FIG. 1, the wireless communication network 100 includes a network node (NN) 110*a*, a network node 110*a*, a network node 110*d*, and a network node 110*e*. The network nodes 110 may support communications with multiple UEs 120. For example, in FIG. 1, the network nodes 110 support communication with a UE 120*a*, a UE 120*b*, a UE 120*c*, and a UE 120*d*. In some examples, a UE 120 may also communicate with other UEs 120 and a network node 110 may communicate with a core network and with other network nodes 110.

The network nodes 110 and the UEs 120 of the wireless communication network 100 may communicate using the electromagnetic spectrum, which may be subdivided by frequency or wavelength into various classes, bands, carriers, or channels. For example, devices of the wireless communication network 100 may communicate using one or more operating bands. In some aspects, multiple wireless communication networks 100 may be deployed in a given geographic area. Each wireless communication network 100 may support a particular RAT (which may also be referred to as an air interface) and may operate on one or more carrier frequencies in one or more frequency bands or ranges. In some examples, when multiple RATs are deployed in a given geographic area, each RAT in the geographic area may operate on different frequencies to avoid interference with other RATs. Additionally or alternatively, in some examples, the wireless communication network 100 may implement dynamic spectrum sharing (DSS), in which multiple RATs are implemented with dynamic bandwidth allocation (for example, based on, or otherwise associated with, user demand) in a single frequency band. In some examples, the wireless communication network 100 may support communication over unlicensed spectrum, where access to an unlicensed channel is subject to a channel access mechanism. For example, in a shared or unlicensed frequency band, a transmitting device may perform a channel access procedure, such as a listen-before-talk (LBT) procedure, to contend against other devices for channel access before transmitting on a shared or unlicensed channel.

Various operating bands have been defined as frequency range designations FR1 (410 MHz through 7.125 GHz), FR2 (24.25 GHz through 52.6 GHz), FR3 (7.125 GHz through 24.25 GHz), FR4a or FR4-1 (52.6 GHz through 71 GHz), FR4 (52.6 GHz through 114.25 GHz), and FR5 (114.25 GHz through 300 GHz). Although a portion of FR1 is greater than 6 GHz, FR1 is often referred to (interchangeably) as a "sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into the mid-band frequencies. Thus, "sub-6 GHz," if used herein, may broadly refer to frequencies that are less than 6 GHz, that are within FR1, or that are included in mid-band frequencies. Similarly, the term "millimeter wave," if used herein, may broadly refer to mid-band frequencies or to frequencies that are within FR2, FR4, FR4-a or FR4-1, FR5, or the EHF band. Higher frequency bands may extend 5G NR operation, 6G operation, or other RATs beyond 52.6 GHz.

A network node 110 or a UE 120 may include one or more devices, components, or systems that enable communication with other devices, components, or systems of the wireless communication network 100. For example, a UE 120 and a network node 110 may each include one or more chips, system-on-chips (SoCs), chipsets, packages, or devices that individually or collectively constitute or comprise a processing system, such as a processing system 140 of the UE 120 or a processing system 145 of the network node 110. A processing system (for example, the processing system 140 or the processing system 145) includes processor (or "processing") circuitry in the form of one or multiple processors, microprocessors, processing units (such as central processing units (CPUs), graphics processing units (GPUs), neural processing units (NPUs) (also referred to as neural network processors or deep learning processors (DLPs)), or digital signal processors (DSPs)), processing blocks, application-specific integrated circuits (ASICs), programmable logic devices (PLDs), or other discrete gate or transistor logic or circuitry (any one or more of which may be generally referred to herein individually as a "processor" or collectively as "the processor" or "the processor circuitry"). Such processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set. In some other examples, each of a group of processors may be configurable or configured to perform a same set of functions.

The processing system 140 and the processing system 145 may each include memory circuitry in the form of one or multiple memory devices, memory blocks, memory elements, or other discrete gate or transistor logic or circuitry, each of which may include or implement tangible storage media such as random-access memory (RAM) or read-only memory (ROM), or combinations thereof (any one or more of which may be generally referred to herein individually as a "memory" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code or instructions (such as software) that, when executed by one or more of the processors, may configure one or more of the processors to perform various functions or operations described herein. Additionally or alternatively, in some examples, one or more of the processors may be configured to perform various functions or operations described herein without requiring configuration by software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise.

The processing system 140 and the processing system 145 may each include or be coupled with one or more modems (such as a cellular (for example, a 5G or 6G compliant) modem). In some examples, one or more processors of the processing system 140 or the processing system 145 include or implement one or more of the modems. The processing system 140 and the processing system 145 may also include or be coupled with multiple radios (collectively "the radio"), multiple RF chains, or multiple transceivers, each of which may in turn be coupled with one or more of multiple antennas. In some examples, one or more processors of the processing system 140 or the processing system 145 include or implement one or more of the radios, RF chains, or transceivers. An RF chain may include one or more filters, mixers, oscillators, amplifiers, analog-to-digital converters (ADCs), or other devices that convert between an analog signal (such as for transmission or reception via an air interface) and a digital signal (such as for processing by the processing system 140 of the UE 120 or by the processing system 145 of the network node 110).

A network node 110 and a UE 120 may each include one or multiple antennas or antenna arrays. Typical network nodes 110 and UEs 120 may include multiple antennas, which may be organized or structured into one or more antenna panels, one or more antenna groups, one or more sets of antenna elements, or one or more antenna arrays, among other examples. As used herein, the term "antenna" can refer to one or more antennas, one or more antenna panels, one or more antenna groups, one or more sets of antenna elements, or one or more antenna arrays. The term "antenna panel" can refer to a group of antennas (such as antenna elements) arranged in an array or panel, which may facilitate beamforming by manipulating parameters associated with the group of antennas. The term "antenna module" may refer to circuitry including one or more antennas as well as one or more other components (such as filters, amplifiers, or processors) associated with integrating the antenna module into a wireless communication device such as the network node 110 and the UE 120.

A network node 110 may be, may include, or may also be referred to as an NR network node, a 5G network node, a 6G network node, a Node B, a gNB, an access point (AP), a transmission reception point (TRP), a network entity, a network element, a network equipment, or another type of device, component, or system included in a radio access network (RAN). In various deployments, a network node 110 may be implemented as a single physical node (for example, a single physical structure) or may be implemented as two or more physical nodes (for example, two or more distinct physical structures). For example, a network node 110 may be a device or system that implements a part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node having an aggregated architecture, meaning that the network node 110 may implement a full radio protocol stack that is physically and logically integrated within a single physical structure in the wireless communication network 100. For example, an aggregated network node 110 may consist of a single standalone base station or a single TRP that operates with a full radio protocol stack to enable or facilitate communication between a UE 120 and a core network of the wireless communication network 100.

Alternatively, and as also shown, a network node 110 may be a disaggregated network node (sometimes referred to as a disaggregated base station), having a disaggregated architecture, meaning that the network node 110 may operate with a radio protocol stack that is physically distributed or logically distributed among two or more nodes in the same geographic location or in different geographic locations. An example disaggregated network node architecture is described in more detail below with reference to FIG. 2. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating network functionality into multiple units or modules that can be individually deployed.

The network nodes 110 of the wireless communication network 100 may include one or more central units (CUs), one or more distributed units (DUs), and one or more radio units (RUs). A CU may host one or more higher layers, such as a radio resource control (RRC) layer, a packet data convergence protocol (PDCP) layer, and a service data adaptation protocol (SDAP) layer, among other examples. A DU may host one or more of a radio link control (RLC) layer, a medium access control (MAC) layer, or one or more higher physical (PHY) layers depending, at least in part, on a functional split, such as a functional split defined by the 3GPP. In some examples, a DU also may host a lower PHY layer that is configured to perform functions, such as a fast Fourier transform (FFT), an inverse FFT (IFFT), beamforming, or physical random access channel (PRACH) extraction and filtering, among other examples. An RU may perform RF processing functions or lower PHY layer functions, such as an FFT, an IFFT, beamforming, or PRACH extraction and filtering, among other examples, according to a functional split, such as a lower layer split (LLS). In such an architecture, each RU can be operated to handle over the air (OTA) communication with one or more UEs 120. In some examples, a single network node 110 may include a combination of one or more CUs, one or more DUs, or one or more RUs. In some examples, a CU, a DU, or an RU may be implemented as a virtual unit, such as a virtual central unit (VCU), a virtual distributed unit (VDU), or a virtual radio unit (VRU), among other examples, which may be implemented as a virtual network function, such as in a cloud deployment.

Some network nodes 110 (for example, a base station, an RU, or a TRP) may provide communication coverage for a particular geographic area. The term "cell" can refer to a coverage area of a network node 110 or to a network node 110 itself, depending on the context in which the term is used. A network node 110 may support one or more cells (for example, each cell may support communication within an angular (for example, 60 degree) range around the network node). In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with associated service subscriptions. A pico cell may cover a relatively small geographic area and may also allow unrestricted access by UEs 120 with associated service subscriptions. A femto cell may cover a relatively small geographic area (for example, a home) and may allow restricted access by UEs 120 having association with the femto cell (for example, UEs 120 in a closed subscriber group (CSG)). In some examples, a cell may not necessarily be stationary. For example, the geographic area of the cell may move according to the location of an associated mobile network node 110 (for example, a train, a satellite, an unmanned aerial vehicle, or an NTN network node).

The wireless communication network 100 may be a heterogeneous network that includes network nodes 110 of different types, such as macro network nodes, pico network nodes, femto network nodes, relay network nodes, aggregated network nodes, or disaggregated network nodes, among other examples. Various different types of network nodes 110 may generally transmit at different power levels, serve different coverage areas (for example, a cell 130*a*, a cell 130*b*, and a cell 130*c*), or have different impacts on interference in the wireless communication network 100 than other types of network nodes 110.

The UEs 120 may be physically dispersed throughout the coverage area of the wireless communication network 100, and each UE 120 may be stationary or mobile. A UE 120 may be, may include, or may also be referred to as an access terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a netbook, a smartbook, an ultrabook, a medical device, a biometric device, a wearable device (for example, a smart watch, smart clothing, smart glasses, a smart wristband, or smart jewelry), a gaming device, an entertainment device (for example, a music device, a video device, or a satellite radio), an XR device, a vehicular component or sensor, a smart meter or sensor, industrial manufacturing equipment, a Global Navigation Satellite System (GNSS) device (such as a Global Positioning System device or another type of positioning device), a UE function of a network node, or any other suitable device or function that may communicate via a wireless medium.

Some UEs 120 may be classified according to different categories in association with different complexities or different capabilities. UEs 120 in a first category may facilitate massive IoT in the wireless communication network 100, and may offer low complexity or cost relative to UEs 120 in a second category. UEs 120 in a second category may include mission-critical IoT devices, legacy UEs, baseline UEs, high-tier UEs, advanced UEs, full-capability UEs, or premium UEs that are capable of URLLC, eMBB, or precise positioning in the wireless communication network 100, among other examples. A third category of UEs 120 may have mid-tier complexity or capability (for example, a capability between that of the UEs 120 of the first category and that of the UEs 120 of the second capability). A UE 120 of the third category may be referred to as a reduced capability UE ("RedCap UE"), a mid-tier UE, an NR-Light UE, or an NR-Lite UE, among other examples. RedCap UEs may bridge a gap between the capability and complexity of NB-IoT devices or eMTC UEs, and mission-critical IoT devices or premium UEs. RedCap UEs may include, for example, wearable devices, IoT devices, industrial sensors, or cameras that are associated with a limited bandwidth, power capacity, or transmission range, among other examples. RedCap UEs may support healthcare environments, building automation, electrical distribution, process automation, transport and logistics, or smart city deployments, among other examples.

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink and uplink resources may include time domain resources (for example, frames, subframes, slots, and symbols), frequency domain resources (for example, frequency bands, component carriers (CCs), subcarriers, resource blocks, and resource elements), and spatial domain resources (for example, particular transmit directions or beams).

Frequency domain resources may be subdivided into bandwidth parts (BWPs). A BWP may be a block of frequency domain resources (for example, a continuous set of resource blocks (RBs) within a full component carrier bandwidth) that may be configured at a UE-specific level. A UE 120 may be configured with both an uplink BWP and a downlink BWP (which may be the same or different). Each BWP may be associated with its own numerology (indicating a sub-carrier spacing (SCS) and cyclic prefix (CP)). A BWP may be dynamically configured or activated (for example, by a network node 110 transmitting a downlink control information (DCI) configuration to the one or more UEs 120) or reconfigured (for example, in real-time or near-real-time) according to changing network conditions in the wireless communication network 100 or specific requirements of one or more UEs 120. An active BWP defines the operating bandwidth of the UE 120 within the operating bandwidth of the serving cell. The use of BWPs enables more efficient use of the available frequency domain resources in the wireless communication network 100 because fewer frequency domain resources may be allocated to a BWP for a UE 120 (which may reduce the quantity of frequency domain resources that a UE 120 is required to monitor and reduce UE power consumption by enabling the UE to monitor fewer frequency domain resources), leaving more frequency domain resources to be spread across multiple UEs 120. Thus, BWPs may also assist in the implementation of lower-capability (for example, RedCap) UEs 120 by facilitating the configuration of smaller bandwidths for communication by such UEs 120 or by facilitating reduced UE power consumption.

As used herein, a downlink signal may be or include a reference signal, control information, or data. For example, downlink reference signals include a primary synchronization signal (PSS), a secondary SS (SSS), an SS block (SSB) (for example, that includes a PSS, an SSS, and a physical broadcast channel (PBCH)), a demodulation reference signal (DMRS), a phase tracking reference signal (PTRS), a tracking reference signal (TRS), and a channel state information (CSI) reference signal (CSI-RS), among other examples. A downlink signal carrying control information or data may be transmitted via a downlink channel. Downlink channels may include one or more control channels for transmitting control information and one or more data channels for transmitting data. Downlink reference signals may be transmitted in addition to, or multiplexed with, downlink control channel communications or downlink data channel communications. A downlink control channel may be specifically used to transmit DCI from a network node 110 to a UE 120. DCI generally contains the information the UE 120 needs to identify RBs in a subsequent subframe and how to decode them, including a modulation and coding scheme (MCS) or redundancy version parameters. Different DCI formats carry different information, such as scheduling information in the form of downlink or uplink grants, slot formal indicators (SFIs), preemption indicators (PIs), transmit power control (TPC) commands, hybrid automatic repeat request (HARQ) information, new data indicators (NDIs), among other examples. A downlink data channel may be used to transmit downlink data (for example, user data associated with a UE 120) from a network node 110 to a UE 120. Downlink control channels may include physical downlink control channels (PDCCHs), and downlink data channels may include physical downlink shared channels (PDSCHs). Control information or data communications may be transmitted on a PDCCH and PDSCH, respectively. For example, a PDCCH can carry DCI, while a PDSCH can carry a MAC control element (MAC-CE), an RRC message, or user data, among other examples. Each PDSCH may carry one or more transport blocks (TBs) of data.

As used herein, an uplink signal may include a reference signal, control information, or data. For example, uplink reference signals include a sounding reference signal (SRS), a PTRS, and a DMRS, among other examples. An uplink signal carrying control information or data may be transmitted via an uplink channel. An uplink channel may include one or more control channels for transmitting control information and one or more data channels for transmitting data. Uplink reference signals may be transmitted in addition to, or multiplexed with, uplink control channel communications or uplink data channel communications. An uplink control channel may be specifically used to transmit uplink control information (UCI) from a UE 120 to a network node 110. An uplink data channel may be used to transmit uplink data (for example, user data associated with a UE 120) from a UE 120 to a network node 110. Uplink control channels may include physical uplink control channels (PUCCHs), and uplink data channels may include physical uplink shared channels (PUSCHs). Control information or data communications may be transmitted on a PUCCH and PUSCH, respectively. For example, a PUCCH can carry UCI, while a PUSCH can carry a MAC-CE, an RRC message, or user data, among other examples. UCI can include a scheduling request (SR), HARQ feedback information (for example, a HARQ acknowledgement (ACK) indication or a HARQ negative acknowledgement (NACK) indication), uplink power control information (for example, an uplink TPC parameter), or CSI, among other examples. CSI can include a channel quality indicator (CQI) (indicative of downlink channel conditions to facilitate selection of transmission parameters, such as an MCS, by a network node 110), a precoding matrix indicator (PMI), a CSI-RS resource indicator (CRI) (for example, indicative of a beam used to transmit a CSI-RS), an SS/PBCH resource block indicator (SSBRI) (for example, indicative of a beam used to transmit an SSB), a layer indicator (LI), a rank indicator (RI), or measurement information (for example, a layer 1 (L1)-reference signal received power (RSRP) parameter, a received signal strength indicator (RSSI) parameter, a reference signal received quality (RSRQ) parameter, among other examples) which can be used for beam management, among other examples. Each PUSCH may carry one or more TBs of data.

The information (for example, data, control information, or reference signal information) transmitted by a network node 110 to a UE 120, or vice versa, may be represented as a sequence of binary bits that are mapped (for example, modulated) to an analog signal waveform (for example, a discrete Fourier transform (DFT)-spread-orthogonal frequency division multiplexing (OFDM) (DFT-s-OFDM) waveform or a CP-OFDM waveform) that is transmitted by the network node 110 or UE 120 over a wireless communication channel. In some examples, the network node 110 or the UE 120 (for example, using the processing system 145 or the processing system 140, respectively) may select an MCS (for example, an order of quadrature amplitude modulation (QAM), such as 64-QAM, 128-QAM, or 256-QAM, among other examples) for a downlink signal or an uplink signal. For example, the network node 110 may select an MCS for a downlink signal in accordance with UCI received from the UE 120. The network node 110 may transmit, to the UE 120, an indication of the selected MCS for the downlink signal, such as via DCI that schedules the downlink signal. As another example, the network node 110 may transmit, and the UE 120 may receive, an indication of an MCS to be applied for the one or more uplink signals, such as via DCI scheduling transmission of the one or more uplink signals.

The network node 110 or the UE 120 (such as by using the processing system 145 or the processing system 140, respectively, or one or more coupled modems) may perform signal processing on the information (such as filtering, amplification, modulation, digital-to-analog conversion, an IFFT operation, multiplexing, interleaving, mapping, or encoding, among other examples) to generate a processed signal in accordance with the selected MCS. In some examples, the network node 110 or the UE 120 (for example, using the processing system 145 or the processing system 140, respectively, or one or more coupled encoders or modems) may perform a channel coding operation or a forward error correction (FEC) operation to control errors in transmitted information. For example, the network node 110 or the UE 120 may perform an encoding operation to generate encoded information (such as by selectively introducing redundancy into the information, typically using an error correction code (ECC), such as a polar code or a low-density parity-check (LDPC) code). The network node 110 or the UE 120 (for example, using the processing system 145 or one or more modems) may further perform spatial processing (for example, precoding) on the encoded information to generate one or more processed or precoded signals for downlink or uplink transmission, respectively. In some examples, the network node 110 or the UE 120 may perform codebook-based precoding or non-codebook-based precoding. Codebook-based precoding may involve selecting a precoder (for example, a precoding matrix) using a codebook. For example, the network node 110 may provide precoding information indicating which precoder, defined by the codebook, is to be used by the UE 120. Non-codebook-based precoding may involve selecting or deriving a precoder based on, or otherwise associated with, one or more downlink or uplink signal measurements. The network node 110 or the UE 120 may transmit the processed downlink or uplink signals, respectively, via one or more antennas.

The network node 110 or the UE 120 may receive uplink signals or downlink signals, respectively, via one or more antennas. The network node 110 or the UE 120 (for example, using the processing system 145 or the processing system 140, respectively, or one or more coupled modems) may perform signal processing (for example, in accordance with the MCS) on the received uplink or downlink signals, respectively (such as filtering, amplification, demodulation, analog-to-digital conversion, an FFT operation, demultiplexing, deinterleaving, de-mapping, equalization, interference cancellation, or decoding, among other examples), to map the received signal(s) to a sequence of binary bits (for example, received information) that estimates the information transmitted by the network node 110 or the UE 120 via the downlink or uplink signals. The network node 110 or the UE 120 (for example, using the processing system 145 or the processing system 140, respectively, or a coupled decoder or one or more modems) may decode the received information (such as by using an ECC, a decoding operation, or an FEC operation) to detect errors or correct bit errors in the received information to generate decoded information. The decoded information may estimate the information transmitted via the downlink or uplink signals.

In some examples, a UE 120 and a network node 110 may perform MIMO communication. "MIMO" generally refers to transmitting or receiving multiple signals (such as multiple layers or multiple data streams) simultaneously over the same time and frequency resources. MIMO techniques generally exploit multipath propagation. A network node 110 or UE 120 may communicate using massive MIMO, multi-user MIMO, or single-user MIMO, which may involve rapid switching between beams or cells. For example, the amplitudes or phases of signals transmitted via antenna elements or sub-elements may be modulated and shifted relative to each other (such as by manipulating a phase shift, a phase offset, or an amplitude) to generate one or more beams, which is referred to as beamforming. For example, the network node **110*b* may generate one or more beams 160*a*, and the UE 120*b* may generate one or more beams 160*b***. The term "beam" may refer to a directional transmission of a wireless signal toward a receiving device or otherwise in a desired direction, a directional reception of a wireless signal from a transmitting device or otherwise in a desired direction, a direction associated with a directional transmission or directional reception, a set of directional resources associated with a signal transmission or signal reception (for example, an angle of arrival, a horizontal direction, or a vertical direction), a set of parameters that indicate one or more aspects of a directional signal, a direction associated with the signal, or a set of directional resources associated with the signal, among other examples.

MIMO may be implemented using various spatial processing or spatial multiplexing operations. In some examples, MIMO may include a massive MIMO technique which may be associated with an increased (for example, "massive") quantity of antennas at the network node 110 or at the UE 120, such as in a network implementing mmWave technology. Massive MIMO may improve communication reliability by enabling a network node 110 or a UE 120 to communicate the same data across different propagation (or spatial) paths. In some examples, MIMO may support simultaneous transmission to multiple receivers, referred to as multi-user MIMO (MU-MIMO). Some RATs may employ MIMO techniques, such as multi-TRP (mTRP) operation (including redundant transmission or reception on multiple TRPs), reciprocity in the time domain or the frequency domain, single-frequency-network (SFN) transmission, or non-coherent joint transmission (NC-JT).

To support MIMO techniques, the network node 110 and the UE 120 may perform one or more beam management operations, such as an initial beam acquisition operation, one or more beam refinement operations, or a beam recovery operation. For example, an initial beam acquisition operation may involve the network node 110 transmitting signals (for example, SSBs, CSI-RSs, or other signals) via respective beams (for example, of the beams **160*a* of the network node 110) and the UE 120 receiving and measuring the signal(s) via respective beams of multiple beams (for example, from the beams 160*b* of the UE 120) to identify a best beam (or beam pair) for communication between the UE 120 and the network node 110. For example, the UE 120 may transmit an indication (for example, in a message associated with a random access channel (RACH) operation) of a (best) identified beam of the network node 110 (for example, by indicating an SSBRI or other identifier associated with the beam). A beam refinement operation may involve a first device (for example, the UE 120 or the network node 110) transmitting signal(s) via a subset of beams (for example, identified based on, or otherwise associated with, measurements reported as part of one or more other beam management operations). A second device (for example, the network node 110 or the UE 120) may receive the signal(s) via a single beam (for example, to identify the best beam for communication from the subset of beams). The beam(s) may be identified via one or more spatial parameters, such as a transmission configuration indicator (TCI) state or a quasi co-location (QCL) parameter, among other examples. The network node 110 and the UE 120** may increase reliability or achieve efficiencies in throughput, signal strength, or other signal properties for massive MIMO operations by performing the beam management operations.

Some aspects and techniques as described herein may be implemented, at least in part, using an artificial intelligence (AI) program (for example, referred to herein as an "AI/ML model"), such as a program that includes a machine learning (ML) model or an artificial neural network (ANN) model. The AI/ML model may be deployed at one or more devices 165 (for example, one or more network nodes 110, one or more UEs 120, or one or more servers, or one or more components of a cloud computing network, among other examples). For example, in an deployment where AI/ML functionality is performed independently at a device 165, sometimes referred to as "overlay AI/ML", the AI/ML model (or an instance or portion of the AI/ML model) may be deployed at a UE 120 (for example, at the processing system 140), a network node 110 (for example, at the processing system 145), one or more servers, or one or more components of a cloud computing network, among other examples. Additionally or alternatively, in a deployment where AI/ML functionality is coordinated between different devices 165, sometimes referred to as "coordinated AI/ML", or performed at all device and network layers, sometimes referred to as "native AI/ML", the AI/ML model (or an instance of the AI/ML model) may be deployed at multiple devices 165 (for example, a first portion of the AI/ML model may be deployed at a UE 120 and a second portion of the AI/ML model may be deployed at a network node 110). In other examples of coordinated AI/ML or native AI/ML, a first AI/ML model may be deployed at a UE 120 and a second AI/ML model may be deployed at a network node 110. The AI/ML model(s) may be configured to enhance various aspects of the wireless communication network 100 (for example, to increase privacy, reliability, or efficient use of network bandwidth, or to reduce latency, among other examples). For example, the AI/ML model(s) may be trained to identify patterns or relationships in data corresponding to the wireless communication network 100, a device, or an air interface, among other examples. The AI/ML model(s) may support operational decisions relating to one or more aspects associated with wireless communications devices, networks, or services.

Accordingly, in some examples, the AI/ML model(s) may enable AI-as-a-Service (for example, an end-to-end AI/ML service via a user plane) for use cases such as a self-organizing network (SON), minimization of drive test (MDT), quality of experience (QoE), positioning, sensing, predictive mobility, or traffic prediction, among other examples. In some examples, AI-as-a-Service use cases may include measurement collection reporting by a UE 120, device selection criteria (for example, according to a geographical area where measurements are to be collected or UE capabilities to be used to collected measurements), or reporting configurations (for example, reporting parameters such as location, time, or sensor information, among other examples). Additionally or alternatively, the AI/ML model(s) may enable AI/ML procedures (for example, RAN-triggered service establishment, configuration, inferencing using UE-side or network-side models, performance monitoring or management, or capability signaling, among other examples). Additionally or alternatively, the AI/ML model(s) may enable RAN-based AI/ML services via one or more application program interfaces (APIs) or management interfaces for use cases such as beam management, radio resource monitoring (RRM) relaxation, mobility prediction, load prediction, network energy savings, or coverage and capacity improvements, among other examples.

In some aspects, the UE 120 may include a communication manager 150. As described in more detail elsewhere herein, the communication manager 150 may receive configuration information that indicates to communicate in accordance with a frame periodicity of ninety milliseconds and in accordance with a quantity of system frame numbers that is a multiple of nine and that is less than one thousand and twenty-four; and communicate in accordance with the configuration information. Additionally or alternatively, the communication manager 150 may perform one or more other operations described herein.

In some aspects, the network node 110 may include a communication manager 155. As described in more detail elsewhere herein, the communication manager 155 may transmit, to a UE, configuration information that indicates to communicate in accordance with a frame periodicity of ninety milliseconds and in accordance with a quantity of system frame numbers that is a multiple of nine and that is less than one thousand and twenty-four; and communicate in accordance with the configuration information. Additionally or alternatively, the communication manager 155 may perform one or more other operations described herein.

Figure 2:
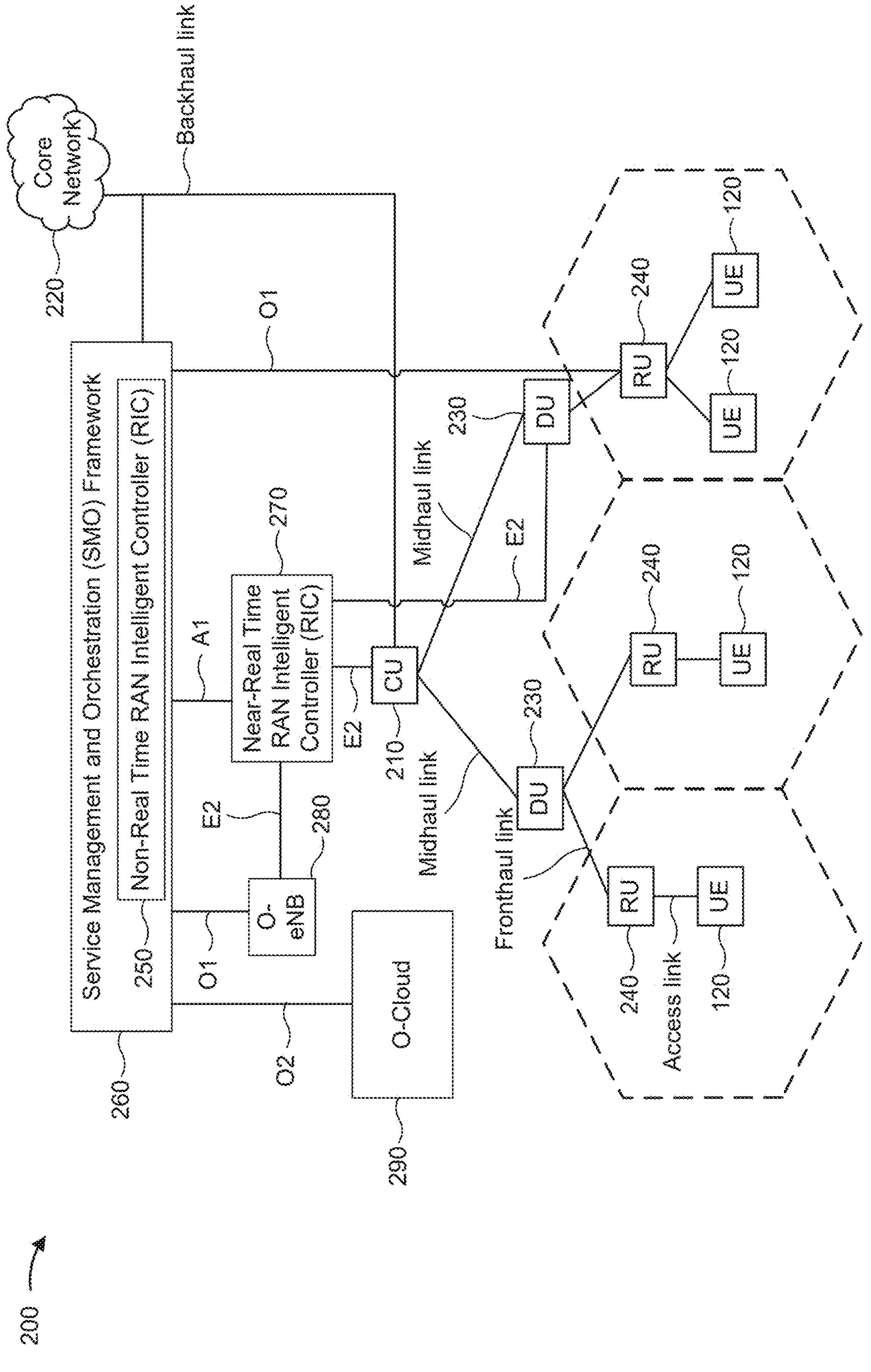
FIG. 2 is a diagram illustrating an example disaggregated network node architecture.

FIG. 2 is a diagram illustrating an example disaggregated network node architecture 200. One or more components of the example disaggregated network node architecture 200 may be, may include, or may be included in one or more network nodes (such one or more network nodes 110). The disaggregated network node architecture 200 may include a CU 210 that can communicate directly with a core network 220 via a backhaul link, or that can communicate indirectly with the core network 220 via one or more disaggregated control units, such as a non-real-time (Non-RT) RAN intelligent controller (RIC) 250 associated with a Service Management and Orchestration (SMO) Framework 260 or a near-real-time (Near-RT) RIC 270 (for example, via an E2 link). The CU 210 may communicate with one or more DUs 230 via respective midhaul links, such as via F1 interfaces. Each of the DUs 230 may communicate with one or more RUs 240 via respective fronthaul links. Each of the RUs 240 may communicate with one or more UEs 120 via respective RF access links. In some deployments, a UE 120 may be simultaneously served by multiple RUs 240.

Each of the components of the disaggregated network node architecture 200, including the CUS 210, the DUs 230, the RUs 240, the Near-RT RICs 270, the Non-RT RICs 250, and the SMO Framework 260, may include one or more interfaces or may be coupled with one or more interfaces for receiving or transmitting signals, such as data or information, via a wired or wireless transmission medium.

In some aspects, the CU 210 may be logically split into one or more CU user plane (CU-UP) units and one or more CU control plane (CU-CP) units. A CU-UP unit may communicate bidirectionally with a CU-CP unit via an interface, such as the E1 interface when implemented in an O-RAN configuration. The CU 210 may be deployed to communicate with one or more DUs 230, as necessary, for network control and signaling. Each DU 230 may correspond to a logical unit that includes one or more base station functions to control the operation of one or more RUs 240. For example, a DU 230 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 230, or for communicating signals with the control functions hosted by the CU 210. Each RU 240 may implement lower layer functionality. In some aspects, real-time and non-real-time aspects of control and user plane communication with the RU(s) 240 may be controlled by the corresponding DU 230.

The SMO Framework 260 may support RAN deployment and provisioning of non-virtualized and virtualized network elements. For non-virtualized network elements, the SMO Framework 260 may support the deployment of dedicated physical resources for RAN coverage requirements, which may be managed via an operations and maintenance interface, such as an O1 interface. For virtualized network elements, the SMO Framework 260 may interact with a cloud computing platform (such as an open cloud (O-Cloud) platform 290) to perform network element life cycle management (such as to instantiate virtualized network elements) via a cloud computing platform interface, such as an O2 interface. A virtualized network element may include, but is not limited to, a CU 210, a DU 230, an RU 240, a non-RT RIC 250, or a Near-RT RIC 270. In some aspects, the SMO Framework 260 may communicate with a hardware aspect of a 4G RAN, a 5G NR RAN, or a 6G RAN, such as an open eNB (O-eNB) 280, via an O1 interface. Additionally or alternatively, the SMO Framework 260 may communicate directly with each of one or more RUs 240 via a respective O1 interface. In some deployments, this configuration can enable each DU 230 and the CU 210 to be implemented in a cloud-based RAN architecture, such as a vRAN architecture.

The Non-RT RIC 250 may include or may implement a logical function that enables non-real-time control and optimization of RAN elements and resources, AI/ML workflows including model training and updates, or policy-based guidance of applications or features in the Near-RT RIC 270. The Non-RT RIC 250 may be coupled to or may communicate with (such as via an A1 interface) the Near-RT RIC 270. The Near-RT RIC 270 may include or may implement a logical function that enables near-real-time control and optimization of RAN elements and resources via data collection and actions via an interface (such as via an E2 interface) connecting one or more CUs 210, one or more DUs 230, or an O-eNB 280 with the Near-RT RIC 270.

In some aspects, to generate AI/ML models to be deployed in the Near-RT RIC 270, the Non-RT RIC 250 may receive parameters or external enrichment information from external servers. Such information may be utilized by the Near-RT RIC 270 and may be received at the SMO Framework 260 or the Non-RT RIC 250 from non-network data sources or from network functions. In some examples, the Non-RT RIC 250 or the Near-RT RIC 270 may tune RAN behavior or performance. For example, the Non-RT RIC 250 may monitor long-term trends and patterns for performance and may employ AI/ML models to perform corrective actions via the SMO Framework 260 (such as reconfiguration via an O1 interface) or via creation of RAN management policies (such as A1 interface policies).

The network node 110, the processing system 145 of the network node 110, the UE 120, the processing system 140 of the UE 120, the CU 210, the DU 230, the RU 240, or any other component(s) of FIG. 1 or FIG. 2 may implement one or more techniques or perform one or more operations associated with system frame number configuration, as described in more detail elsewhere herein. For example, the processing system 145 of the network node 110, the processing system 140 of the UE 120, the CU 210, the DU 230, or the RU 240 may perform or direct operations of, for example, process 500 of FIG. 5, process 600 of FIG. 6, or other processes as described herein (alone or in conjunction with one or more other processors). Memory of the network node 110 may store data and program code (or instructions) for the network node 110, the CU 210, the DU 230, or the RU 240. In some examples, the memory of the network node 110 may store data relating to a UE 120, such as RRC state information or a UE context. Memory of a UE 120 may store data and program code (or instructions) for the UE 120, such as context information. In some examples, the memory of the UE 120 or the memory of the network node 110 may include a non-transitory computer-readable medium storing a set of instructions for wireless communication. For example, the set of instructions, when executed by one or more processors (for example, of the processing system 145 or the processing system 140) of the network node 110, the UE 120, the CU 210, the DU 230, or the RU 240, may cause the one or more processors to perform process 500 of FIG. 5, process 600 of FIG. 6, or other processes as described herein. In some examples, executing instructions may include running the instructions, converting the instructions, compiling the instructions, or interpreting the instructions, among other examples.

In some aspects, the UE 120 includes means for receiving configuration information that indicates to communicate in accordance with a frame periodicity of ninety milliseconds and in accordance with a quantity of system frame numbers that is a multiple of nine and that is less than one thousand and twenty-four; or means for communicating in accordance with the configuration information. The means for the UE 120 to perform operations described herein may include, for example, one or more of communication manager 150, processing system 140, a radio, one or more RF chains, one or more transceivers, one or more antennas, one or more modems, a reception component, or a transmission component, among other examples.

In some aspects, the network node includes 110 means for transmitting, to a UE, configuration information that indicates to communicate in accordance with a frame periodicity of ninety milliseconds and in accordance with a quantity of system frame numbers that is a multiple of nine and that is less than one thousand and twenty-four; or means for communicating in accordance with the configuration information. The means for the network node 110 to perform operations described herein May include, for example, one or more of communication manager 155, processing system 145, a radio, one or more RF chains, one or more transceivers, one or more antennas, one or more modems, a reception component, or a transmission component, among other examples.

Figure 3:
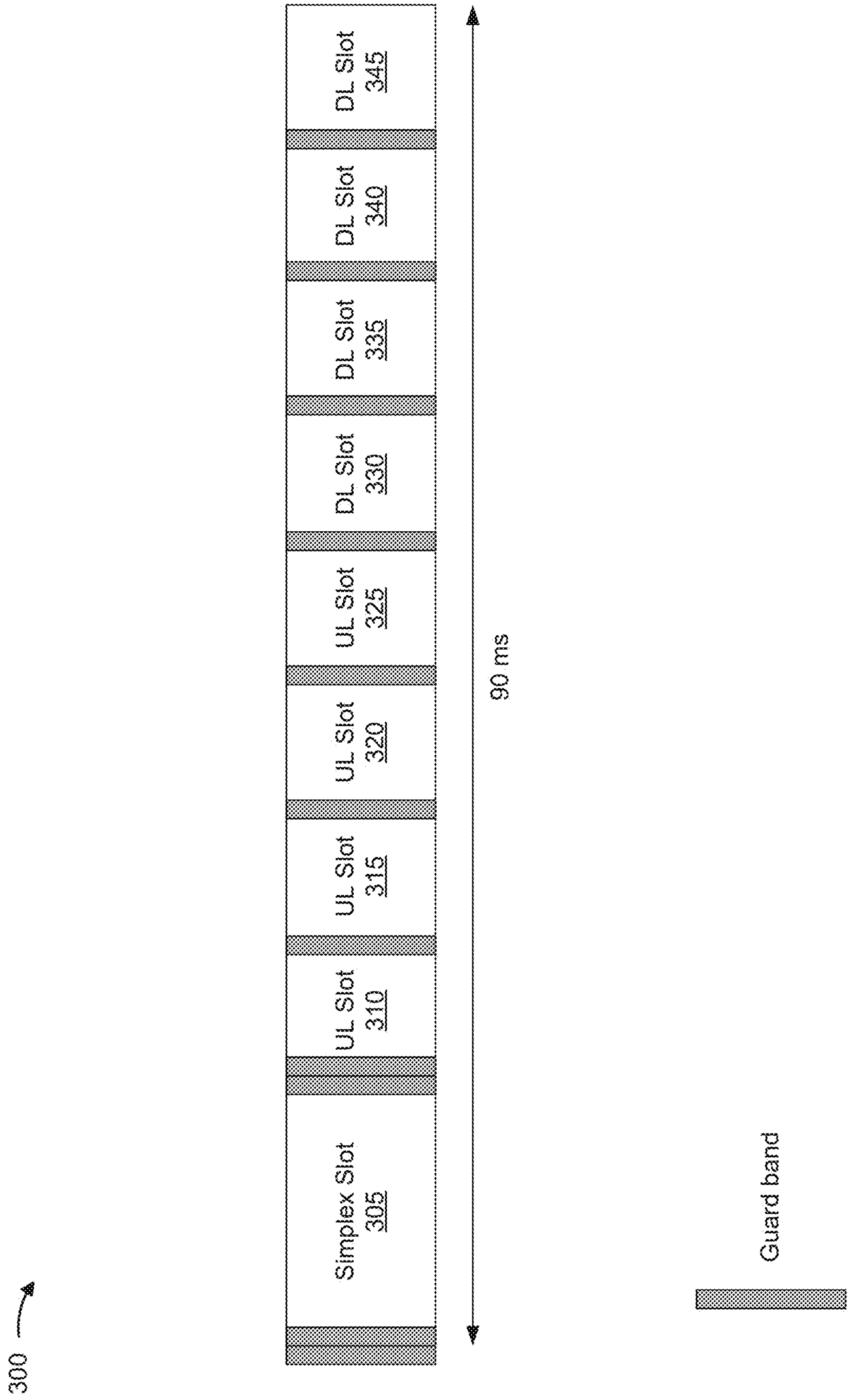
FIG. 3 is a diagram illustrating an example of a frame structure for narrowband Internet of Things time division duplexing communications.

FIG. 3 is a diagram illustrating an example of a frame structure 300 for narrowband Internet of Things time division duplexing communications. For example, the frame structure 300 may be used for communications by or with a NB-IoT TDD cell (for example, operating in an MSS band). In some examples, the frame structure may have periodicity of 90 ms. The frame structure 300 may include a simplex slot 305. A simplex slot refers to a time interval assigned within a communication channel for unidirectional data transmission. In some examples, the simplex slot 305 may be used for downlink communications only, such as for ring and messaging channels. Additionally, the frame structure 300 may include a plurality of uplink slots, such as UL slot 310, UL slot 315, UL slot 320, and UL slot 325. Further, the frame structure 300 may include a plurality of downlink slots, such as DL slot 330, DL slot 335, DL slot 340, and DL slot 345. The frame structure 300 may additionally include a guard band between some or all of the components of the frame structure 300. In some examples, the simplex slot 305 may have a duration of 20.32 ms, each uplink slot may have a duration of 8.28 ms, and each downlink slot may have a duration of 8.28 ms. Therefore, a frame structure 300 that includes a single simplex slot, four uplink slots, and four downlink slots may have a duration of 90 ms.

As described herein, a duration of the frame structure 300 for NB-IoT TDD cell communications is 90 ms. Since each SFN has a duration of 10 ms, the frame may be spread over nine SFNs. However, as also described herein, an H-SFN may be configured with values from 0 to 1023, thereby wrapping around after 1024 H-SFNs. Currently, NB-IoT may uses the SFN and H-SFN for RA-RNTI processes, SIB scheduling, PUR determination, DRX (such as eDRX) communications, SC-PTM communications, and MCCH communications. However, 1024 H-SFNs (which corresponds to 1,048,576 SFNs) is not divisible by nine. Therefore, when the H-SFN counter reaches 1023 (the end of the counter) and wraps around (resets to 0), the wrap-around may occur in the middle of a frame for NB IoT TDD communications. This may result in synchronization issues between the UE 120 and the network node 110. For example, if a communication pattern is broken at a wrap-around point, the UE 120 may attempt to transmit during a reception period, or may attempt to receive during a transmission period, thereby resulting in missed or dropped communications between the UE and the network node. Additionally, this misalignment between the frame periodicity (90 ms) and wrap-around point (1024 SFN) may negatively impact resource scheduling. For example, when a transmission schedule does not align with a total SFN count, scheduling transmissions near the wrap-around point may become more complicated, thereby increasing computational overhead and system complexity. Further, the misalignment between the frame periodicity and the wrap-around point may negatively impact procedures that rely on consistent frame patterns, such as broadcast channel scheduling, system information updates, paging procedures, random access opportunities, and power saving modes, among other examples.

Figure 4:
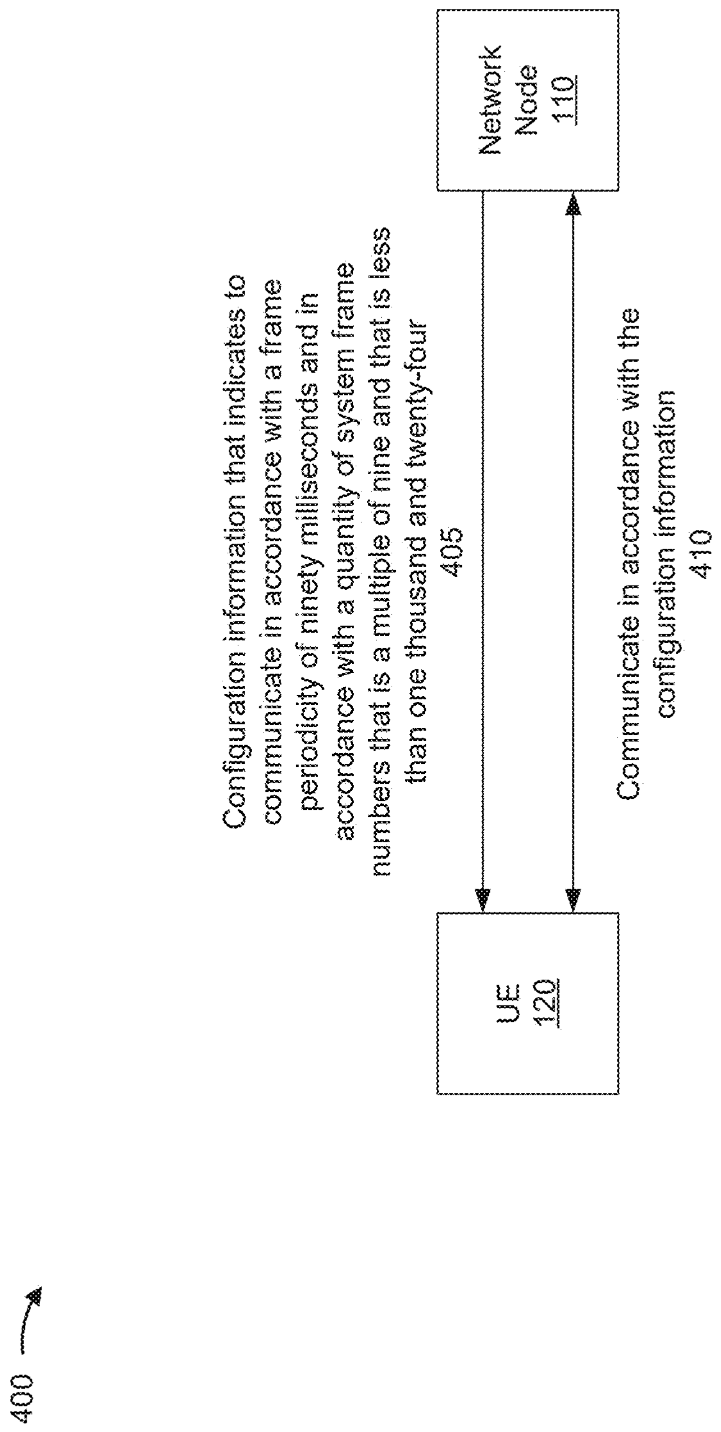
FIG. 4 is a diagram illustrating an example of system frame number configurations.

FIG. 4 is a diagram illustrating an example 400 of system frame number configurations. The UE 120 may communicate with the network node 110. In some aspects, the network node 110 may be an NTN node. For example, the network node 110 may be an NTN node configured to perform NB IoT communications.

In a first operation 405, the network node 110 may transmit, and the UE 120 may receive, configuration information that indicates to communicate in accordance with a frame periodicity of 90 milliseconds and in accordance with a quantity of SFNs that is a multiple of nine (or that is a multiple of ninety) and that is less than 1024. In some aspects, the quantity of SFNs may be a quantity of H-SFNs. In some aspects, the quantity of system frame numbers for each hyper system frame number is less than 1024. In some other aspects, the quantity of system frame numbers for each hyper system frame number is equal to 1024. In some aspects, the configuration information may be included in a SIB1. For example, the network node 110 may broadcast a SIB1 that includes the configuration information, and the UE 120 may receive the broadcast message that includes the SIB1 and may obtain the configuration information from the SIB1. In one example, the configuration information may indicate that the quantity (total quantity) of H-SFNs is to be 990 (ranging from 0 to 989). For example, the SIB1 may indicate that only H-SFN values from 0 to 989 may be used for NB IoT NTN TDD cell communications. Additionally or alternatively, the SIB1 may indicate that H-SFN values from 990 to 1023 may not be used for NB IoT NTN TDD cell communications. Since 990 is a multiple of nine (corresponding to the quantity of H-SFNs for NB IoT NTN TDD cell communications), the wrap-around point of the total quantity of H-SFNs may align with the periodicity (90 ms) of the frames. An example of H-SFN wrap-around in accordance with a periodicity of the H-SFNs for NB IoT NTN TDD cell communications is shown in Table 1.

TABLE 1

| H-SFN | 986 | 987 | 988 | 989 | 0 (H-SFN wrap-around) | 1 | 2 | 3 |
|---|---|---|---|---|---|---|---|---|
| SFN 0 | | | | | 0 | | | |
| SFN 1 | 1 | | | | | | | |
| SFN 2 | | | | | | 2 | | |
| SFN 3 | | 3 | | | | | | |
| SFN 4 | | | | | | | 4 | |
| SFN 5 | | | 5 | | | | | |
| SFN 6 | | | | | | | | 6 |
| SFN 7 | | | | 7 | | | | |
| SFN 8 | | | | | | | | |
| SFN 9 | | | | | 9 | | | |
| SFN 10 | 10 | | | | | | | |
| SFN 11 | | | | | | 11 | | |
| SFN 12 | | 12 | | | | | | |
| SFN 13 | | | | | | | 13 | |
| SFN 14 | | | 14 | | | | | |
| SFN 15 | | | | | | | | 15 |
| SFN 16 | | | | 16 | | | | |
| SFN 17 | | | | | | | | |
| SFN 18 | | | | | 18 | | | |
| SFN 19 | 19 | | | | | | | |

In some aspects, the configuration information may indicate to use the reduced quantity of H-SFNs only for NB IoT NTN TDD cell communications. For example, the configuration information may indicate to use H-SFN values 0 through 989 for NB IoT NTN TDD cell communications, and otherwise, to use H-SFN values 0 through 1023. In some aspects, H-SFN 0 to H-SFN 1023 are still used and the starting SFN is determined from the calculation is move to the next valid SFN or next closest valid SFN. In this scenario, the network may broadcast a reference time where the first valid SFN occurs.

In some aspects, the configuration information may indicate that a duration of a DRX cycle of the UE 120 (e.g., an eDRX cycle of the UE 120) is to be longer than the duration of the 990 H-SFN. In some aspects, the configuration information may indicate that a duration of a DRX cycle of the UE 120 (e.g., an eDRX cycle of the UE 120) is to be shorter than the duration of the amount of H-SFN where amount of H-SFN is less than 1024. In some aspects, the maximum value of the eDRX cycle of the UE 120 is 990 hyper frames (e.g., 28.416 hours), which is 42.66 minutes shorter than the maximum configured duration for NB IoT eDRX. Similar values may be configured at the core network (e.g., at a mobility management entity (MME)) or at a non-access stratum (NAS) component of the UE 120. In some aspects, the eDRX cycle of the UE 120 may be configured as follows:

- The PH is the H-SFN satisfying the following equation:
  - o H-SFN mod $T_{eDRX,H}$ = (UE_ID_H mod $T_{eDRX,H}$), where
    - ■ UE_ID_H:
      - 10 most significant bits of the Hashed ID, if P-RNTI is monitored on PDCCH or MPDCCH
      - 12 most significant bits of the Hashed ID, if P-RNTI is monitored on NPDCCH
    - ■ $T_{eDRX,H}$ : eDRX cycle of the UE in Hyper-frames, ($T_{eDRX,H}$ =1, 2, . . . , 256 Hyper-frames) (for NB-IoT, $T_{eDRX,H}$ =2, ... , 1024 Hyper-frames, for NB-IoT NTN TDD, $T_{eDRX,H}$ =2, . . . , 990 Hyper-frames) and configured by upper layers.
    - ■ H-SFN : 0, . . . , 1023 Hyper-frames (for NB-IoT NTN TDD, 0, . . . , 989 Hyper-frames ).

In some aspects, the PH (paging H-SFN) remains always same and the gap between two consequent PHs may not be equal to the duration of the eDRX cycle. When the UE wakes up at its PH, it may cause UE to wake up early.

Additionally or alternatively, the eDRX cycle of the UE 120 may be configured as follows: to enable system information update notification for RRC_IDLE UEs configured to use a DRX cycle longer than the modification period, an eDRX acquisition period is defined. The boundaries of the eDRX acquisition period are determined by H-SFN values for which H-SFN mod 256=0. For NB-IoT, the boundaries of the eDRX acquisition period are determined by H-SFN values for which H-SFN mod 1024=0. For NB-IoT NTN TDD, the boundaries of the eDRX acquisition period are determined by H-SFN values for which H-SFN mod 990=0.

In some aspects, SI scheduling for NB IoT NTN TDD cell communications may be based on or otherwise associated with the 990 H-SFN periodicity. For at least some communications other than NB IoT NTN TDD cell communications, a modification boundary for the SI may be repeated every four H-SFN (4096 SFN). However, since 990 is not divisible by four, the SI modification boundary for NB IoT NTN TDD cell communications may be three H-SFN (3072 SFN) or five H-SFN (5120 SFN). In these examples, the value of rf4096 of the si-Periodicity-r13 may not be used. Instead, a periodicity value of rf3072 (for three H-SFN) or rf5120 (for five H-SFN) may be used.

In some aspects, SI scheduling may be configured as follows: the possible boundaries of modification for SystemInformationBlockType1-BR are defined by SFN values for which SFN mod 512=0 except for notification of ETWS/CMAS for which the eNB may change SystemInformationBlockType1-BR content at any time. For NB-IoT, the possible boundaries of modification for SystemInformationBlockType1-NB are defined by SFN values for which (H-SFN*1024+SFN) mod 5120=0 in NTN TDD, otherwise (H-SFN*1024+SFN) mod 4096=0. Additionally or alternatively, the SI scheduling may be configured as follows:

```
SchedulingInfo-NB-r13::=      SEQUENCE {
  si-Periodicity-r13                ENUMERATED {rf64,
  rf128, rf256, rf512,
                                  rf1024, rf2048, rf4096, rf3072}.
```

In some aspects, a modification periodicity (m) for SI scheduling may be configured not to exceed 990 H-SFN, where m is a divisor or is 990 multiplied by 1024 (SFN). Therefore, the minimum value for the modification periodicity may be 30.72 s (3072 SFN) or 51.20 s (5120 SFN). In some aspects, the modification periodicity may be configured as follows: actual modification period, expressed in number of radio frame s=modificationPeriodCoeff*defaultPagingCycle, where n16 corresponds to value 16, n32 corresponds to value 32, and so on. The MCCH modification period should be larger or equal to 51.20 s in NTN TDD, otherwise 40.96 s. Similar values as those described above for SI scheduling and modification periodicity may be applied for an MCCH modification boundary and modification periodicity.

In some aspects, PUR scheduling for NB IoT NTN TDD cell communications may be based on or otherwise associated with the 990 H-SFN periodicity. For at least some communications other than NB IoT NTN TDD cell communications, a modification boundary for the PUR may be repeated every four H-SFN (4096 SFN). However, since 990 is not divisible by four, the PUR modification boundary for NB IoT NTN TDD cell communications may be three H-SFN (3072 SFN) or five H-SFN (5120 SFN). In these examples, the value of rf4096 of the si-Periodicity-r13 may not be used. Instead, a periodicity value of rf3072 (for three H-SFN) or rf5120 (for five H-SFN) may be used. In some aspects, PUR scheduling may be configured as follows:

- The UE configured with pur-Config shall:
  - 1> consider that the first PUR occasion occurs at the H-SFN/SFN/subframe given by:
    - For NTN TDD, H-SFN = (H-SFN$_{Ref}$ + offset) mod 990 occuring after FLOOR (offset/990) H-SFN cycles, otherwise H-SFN = (H-SFN$_{Ref}$ + offset) mod 1024 occurring after FLOOR (offset/1024) H-SFN cycles;
    - SFN and subframe indicated by startSFN and startSubframe;
    - where:
    - offset is given by periodicityAndOffset;
    - H-SFN$_{Ref}$ corresponds to the last subframe of the first transmission of RRCConnectionRelease message containing pur-Config, taking into account hsfn-LSB-Info;
    - H-SFN cycle corresponds to the duration of 1024 H-SFNs.

In a second operation 410, the UE 120 and the network node 110 may communicate in accordance with the configuration information. For example, the UE 120 and the network node 110 may communicate in accordance with a frame periodicity of 90 milliseconds and in accordance with a quantity of SFNs that is a multiple of nine and that is less than 1024.

Figure 5:
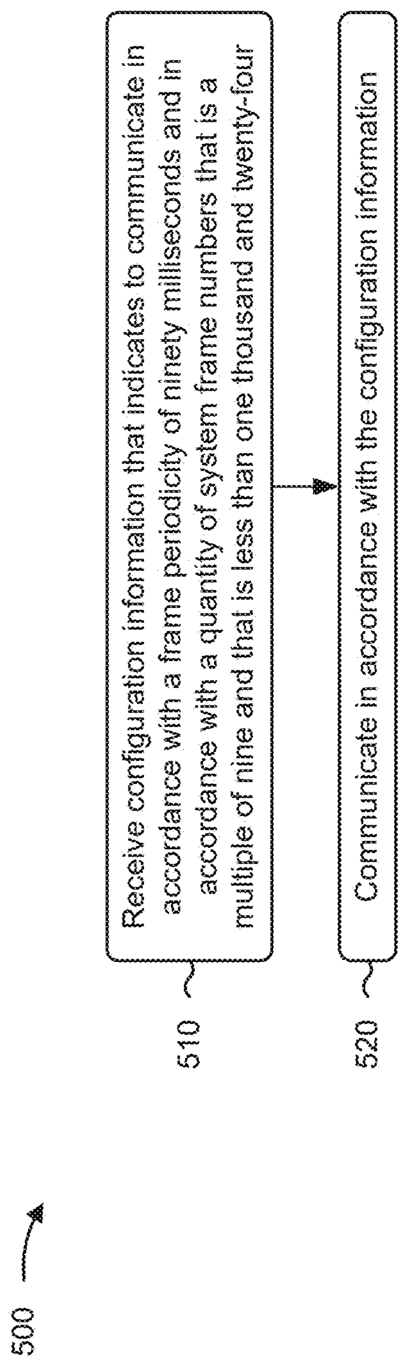
FIG. 5 is a flowchart illustrating an example process performed, for example, at a user equipment (UE) or an apparatus of a UE that supports wireless communication.

FIG. 5 is a flowchart illustrating an example process 500 performed, for example, at a UE or an apparatus of a UE that supports wireless communication. Example process 500 is an example where the apparatus or the UE (for example, UE 120) performs operations associated with system frame number configuration.

As shown in FIG. 5, in some aspects, process 500 may include receiving configuration information that indicates to communicate in accordance with a frame periodicity of ninety milliseconds and in accordance with a quantity of system frame numbers that is a multiple of nine and that is less than one thousand and twenty-four (block 510). For example, the UE (such as by using communication manager 150, reception component 702, or configuration component 710, depicted in FIG. 7) may receive configuration information that indicates to communicate in accordance with a frame periodicity of ninety milliseconds and in accordance with a quantity of system frame numbers that is a multiple of nine and that is less than one thousand and twenty-four, as described above.

As further shown in FIG. 5, in some aspects, process 500 may include communicating in accordance with the configuration information (block 520). For example, the UE (such as by using communication manager 150, reception component 702, or transmission component 704, depicted in FIG. 7) may communicate in accordance with the configuration information, as described above.

Process 500 may include additional aspects, such as any single aspect or any combination of aspects described below or in connection with one or more other processes described elsewhere herein.

In a first additional aspect, the quantity of system frame numbers is a quantity of hyper system frame numbers.

In a second additional aspect, alone or in combination with the first aspect, the configuration information is associated with narrowband Internet of Things communications.

In a third additional aspect, alone or in combination with one or more of the first and second aspects, the configuration information is associated with non-terrestrial network node time-division duplexing communications.

In a fourth additional aspect, alone or in combination with one or more of the first through third aspects, the configuration information is included in a system information block.

In a fifth additional aspect, alone or in combination with one or more of the first through fourth aspects, the quantity of system frame numbers is nine hundred and ninety hyper system frame numbers.

In a sixth additional aspect, alone or in combination with one or more of the first through fifth aspects, thirty four system frame numbers of the nine hundred and ninety system frame numbers are unused.

In a seventh additional aspect, alone or in combination with one or more of the first through sixth aspects, the configuration information indicates that a discontinuous reception cycle of the UE is to have a duration that is in accordance with the quantity of system frame numbers.

In an eighth additional aspect, alone or in combination with one or more of the first through seventh aspects, the duration of the discontinuous reception cycle of the UE is less than a duration associated with the quantity of system frame numbers.

In a ninth additional aspect, alone or in combination with one or more of the first through eighth aspects, the configuration information indicates that system information communications are to be scheduled in accordance with the quantity of system frame numbers.

In a tenth additional aspect, alone or in combination with one or more of the first through ninth aspects, the configuration information indicates that a system information modification boundary is to occur in accordance with a periodicity of three hyper system frame numbers.

In an eleventh additional aspect, alone or in combination with one or more of the first through tenth aspects, the configuration information indicates that a system information modification boundary is to occur in accordance with a periodicity of five hyper system frame numbers.

In a twelfth additional aspect, alone or in combination with one or more of the first through eleventh aspects, the configuration information indicates that multicast control channel communications are to be scheduled in accordance with the quantity of system frame numbers.

In a thirteenth additional aspect, alone or in combination with one or more of the first through twelfth aspects, the configuration information indicates that a multicast control channel modification boundary is to occur in accordance with a periodicity of three hyper system frame numbers.

In a fourteenth additional aspect, alone or in combination with one or more of the first through thirteenth aspects, the configuration information indicates that a multicast control channel modification boundary is to occur in accordance with a periodicity of five hyper system frame numbers.

In a fifteenth additional aspect, alone or in combination with one or more of the first through fourteenth aspects, the configuration information indicates that preconfigured uplink resource communications are to be scheduled in accordance with the quantity of system frame numbers.

In a sixteenth additional aspect, alone or in combination with one or more of the first through fifteenth aspects, the configuration information indicates that a preconfigured uplink resource modification boundary is to occur in accordance with a periodicity of three hyper system frame numbers.

In a seventeenth additional aspect, alone or in combination with one or more of the first through sixteenth aspects, the configuration information indicates that a preconfigured uplink resource modification boundary is to occur in accordance with a periodicity of five hyper system frame numbers.

Although FIG. 5 shows example blocks of process 500, in some aspects, process 500 may include additional blocks, fewer blocks, different blocks, or differently arranged blocks than those depicted in FIG. 5. Additionally or alternatively, two or more of the blocks of process 500 may be performed in parallel.

Figure 6:
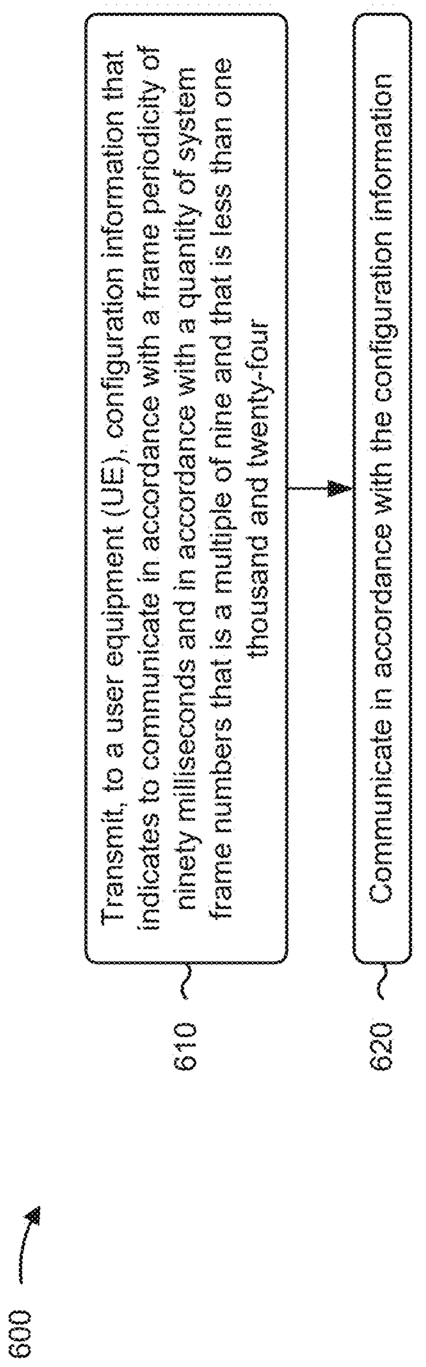
FIG. 6 is a flowchart illustrating an example process performed, for example, at a network node or an apparatus of a network node that supports wireless communication.

FIG. 6 is a flowchart illustrating an example process 600 performed, for example, at a network node or an apparatus of a network node that supports wireless communication. Example process 600 is an example where the apparatus or the network node (for example, network node 110) performs operations associated with system frame number configuration.

As shown in FIG. 6, in some aspects, process 600 may include transmitting, to a UE, configuration information that indicates to communicate in accordance with a frame periodicity of ninety milliseconds and in accordance with a quantity of system frame numbers that is a multiple of nine and that is less than one thousand and twenty-four (block 610). For example, the network node (such as by using communication manager 150, transmission component 804, or configuration component 810, depicted in FIG. 8) may transmit, to a UE, configuration information that indicates to communicate in accordance with a frame periodicity of ninety milliseconds and in accordance with a quantity of system frame numbers that is a multiple of nine and that is less than one thousand and twenty-four, as described above.

As further shown in FIG. 6, in some aspects, process 600 may include communicating in accordance with the configuration information (block 620). For example, the network node (such as by using communication manager 150, reception component 802, or transmission component 804, depicted in FIG. 8) may communicate in accordance with the configuration information, as described above.

Process 600 may include additional aspects, such as any single aspect or any combination of aspects described below or in connection with one or more other processes described elsewhere herein.

In a first additional aspect, the quantity of system frame numbers is a quantity of hyper system frame numbers.

In a second additional aspect, alone or in combination with the first aspect, the configuration information is associated with narrowband Internet of Things communications.

In a third additional aspect, alone or in combination with one or more of the first and second aspects, the configuration information is associated with non-terrestrial network node time-division duplexing communications.

In a fourth additional aspect, alone or in combination with one or more of the first through third aspects, the configuration information is included in a system information block.

In a fifth additional aspect, alone or in combination with one or more of the first through fourth aspects, the quantity of system frame numbers is nine hundred and ninety hyper system frame numbers.

In a sixth additional aspect, alone or in combination with one or more of the first through fifth aspects, thirty four system frame numbers of the nine hundred and ninety system frame numbers are unused.

In a seventh additional aspect, alone or in combination with one or more of the first through sixth aspects, the configuration information indicates that a discontinuous reception cycle of the UE is to have a duration that is in accordance with the quantity of system frame numbers.

In an eighth additional aspect, alone or in combination with one or more of the first through seventh aspects, the duration of the discontinuous reception cycle of the UE is less than a duration associated with the quantity of system frame numbers.

In a ninth additional aspect, alone or in combination with one or more of the first through eighth aspects, the configuration information indicates that system information communications are to be scheduled in accordance with the quantity of system frame numbers.

In a tenth additional aspect, alone or in combination with one or more of the first through ninth aspects, the configuration information indicates that a system information modification boundary is to occur in accordance with a periodicity of three hyper system frame numbers.

In an eleventh additional aspect, alone or in combination with one or more of the first through tenth aspects, the configuration information indicates that a system information modification boundary is to occur in accordance with a periodicity of five hyper system frame numbers.

In a twelfth additional aspect, alone or in combination with one or more of the first through eleventh aspects, the configuration information indicates that multicast control channel communications are to be scheduled in accordance with the quantity of system frame numbers.

In a thirteenth additional aspect, alone or in combination with one or more of the first through twelfth aspects, the configuration information indicates that a multicast control channel modification boundary is to occur in accordance with a periodicity of three hyper system frame numbers.

In a fourteenth additional aspect, alone or in combination with one or more of the first through thirteenth aspects, the configuration information indicates that a multicast control channel modification boundary is to occur in accordance with a periodicity of five hyper system frame numbers.

In a fifteenth additional aspect, alone or in combination with one or more of the first through fourteenth aspects, the configuration information indicates that preconfigured uplink resource communications are to be scheduled in accordance with the quantity of system frame numbers.

In a sixteenth additional aspect, alone or in combination with one or more of the first through fifteenth aspects, the configuration information indicates that a preconfigured uplink resource modification boundary is to occur in accordance with a periodicity of three hyper system frame numbers.

In a seventeenth additional aspect, alone or in combination with one or more of the first through sixteenth aspects, the configuration information indicates that a preconfigured uplink resource modification boundary is to occur in accordance with a periodicity of five hyper system frame numbers.

Although FIG. 6 shows example blocks of process 600, in some aspects, process 600 may include additional blocks, fewer blocks, different blocks, or differently arranged blocks than those depicted in FIG. 6. Additionally or alternatively, two or more of the blocks of process 600 may be performed in parallel.

Figure 7:
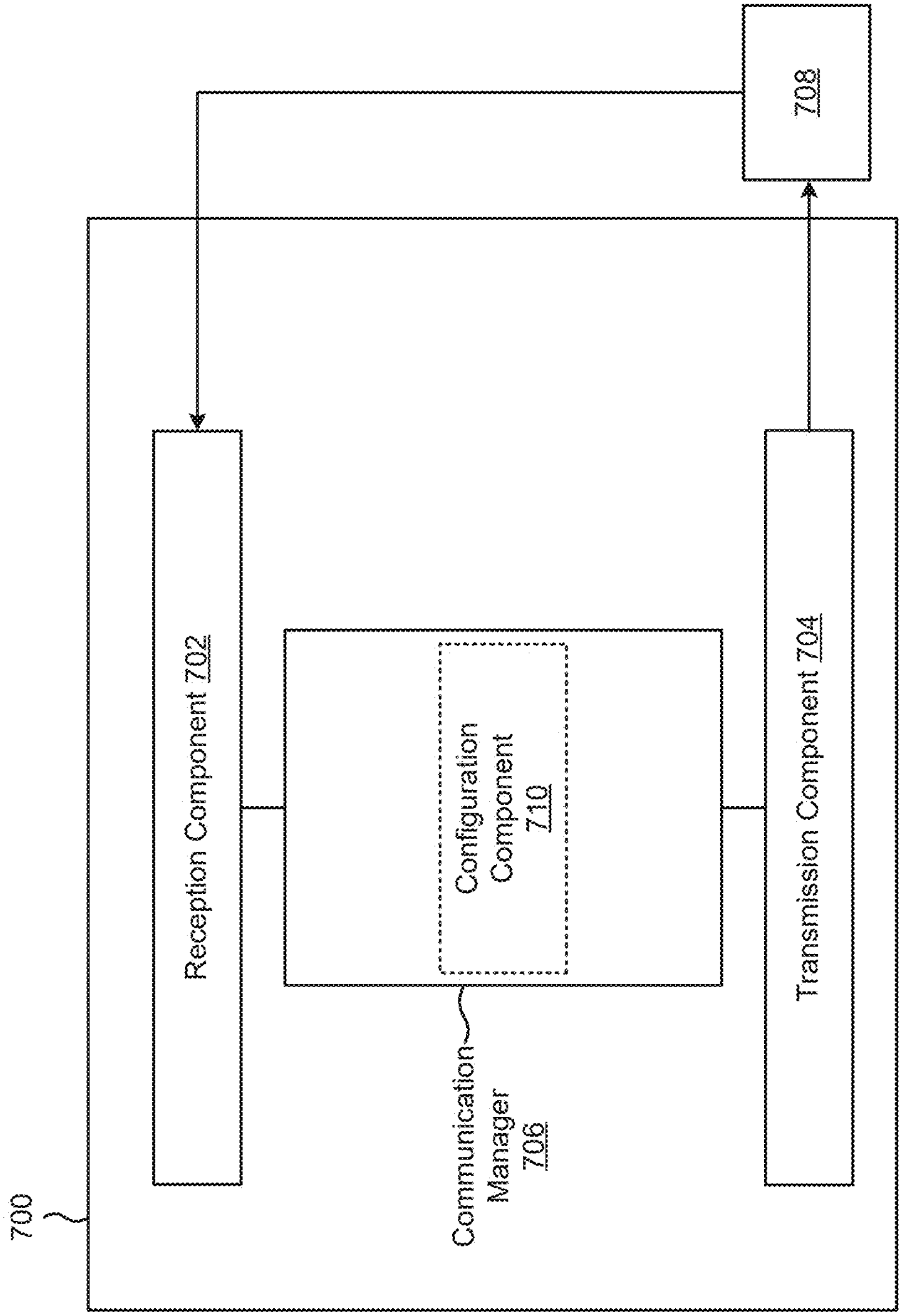
FIG. 7 is a diagram of an example apparatus for wireless communication that supports wireless communications.

FIG. 7 is a diagram of an example apparatus 700 for wireless communication that supports wireless communications. The apparatus 700 may be a UE, or a UE may include the apparatus 700. In some aspects, the apparatus 700 includes a reception component 702, a transmission component 704, and a communication manager 706, which may be in communication with one another (for example, via one or more buses). As shown, the apparatus 700 may communicate with another apparatus 708 (such as a UE 120, a network node 110, or another wireless communication device) using the reception component 702 and the transmission component 704. The communication manager 706 may be included in, or implemented via, a processing system (for example, the processing system 140). In some aspects, the communication manager 706 is the communication manager 155.

In some aspects, the apparatus 700 may be configured to or operable to perform one or more operations described herein in connection with FIG. 4. Additionally or alternatively, the apparatus 700 may be configured to or operable to perform one or more processes described herein, such as process 500 of FIG. 5.

The reception component 702 may receive communications, such as reference signals, control information, or data communications, from the apparatus 708. The reception component 702 may provide received communications to one or more other components of the apparatus 700, such as the communication manager 706. In some aspects, the reception component 702 may perform signal processing on the received communications, and may provide the processed signals to the one or more other components in a similar manner as described above in connection with FIG. 1. In some aspects, the reception component 702 may include one or more components of the UE described above in connection with FIG. 1, such as a radio, one or more RF chains, one or more transceivers, or one or more modems, each of which may in turn be coupled with one or more antennas of the UE.

The transmission component 704 may transmit communications, such as reference signals, control information, or data communications, to the apparatus 708. In some aspects, the communication manager 706 may generate communications and may transmit the generated communications to the transmission component 704 for transmission to the apparatus 708. In some aspects, the transmission component 704 may perform signal processing on the generated communications, and may transmit the processed signals to the apparatus 708 in a similar manner as described above in connection with FIG. 1. In some aspects, the transmission component 704 may include one or more components of the UE described above in connection with FIG. 1, such as a radio, one or more RF chains, one or more transceivers, or one or more modems, each of which may in turn be coupled with one or more antennas of the UE. In some aspects, the transmission component 704 may be co-located with the reception component 702.

The communication manager 706 may receive or may cause the reception component 702 to receive configuration information that indicates to communicate in accordance with a frame periodicity of ninety milliseconds and in accordance with a quantity of system frame numbers that is a multiple of nine and that is less than one thousand and twenty-four. The communication manager 706 may communicate in accordance with the configuration information. In some aspects, the communication manager 706 may perform one or more operations described elsewhere herein as being performed by one or more components of the communication manager 706.

In some aspects, the communication manager 706 includes a set of components, such as a configuration component 710. Alternatively, the set of components may be separate and distinct from the communication manager 706. As used herein, the term "component" is intended to be broadly construed as hardware or a combination of hardware and at least one of software or firmware. In some aspects, one or more components of the set of components may include or may be implemented within a processing system (for example, the processing system 140). Additionally or alternatively, one or more components of the set of components may be implemented at least in part as software stored in one or more memories (for example, the memory described with reference to FIG. 1). For example, a component (or a portion of a component) may be implemented as instructions or code stored in a non-transitory computer-readable medium and executable by the processing system to perform the functions or operations of the component.

The reception component 702 or the configuration component 710 may receive configuration information that indicates to communicate in accordance with a frame periodicity of ninety milliseconds and in accordance with a quantity of system frame numbers that is a multiple of nine and that is less than one thousand and twenty-four. The reception component 702 or the transmission component 704 may communicate in accordance with the configuration information.

The quantity and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 7.

Figure 8:
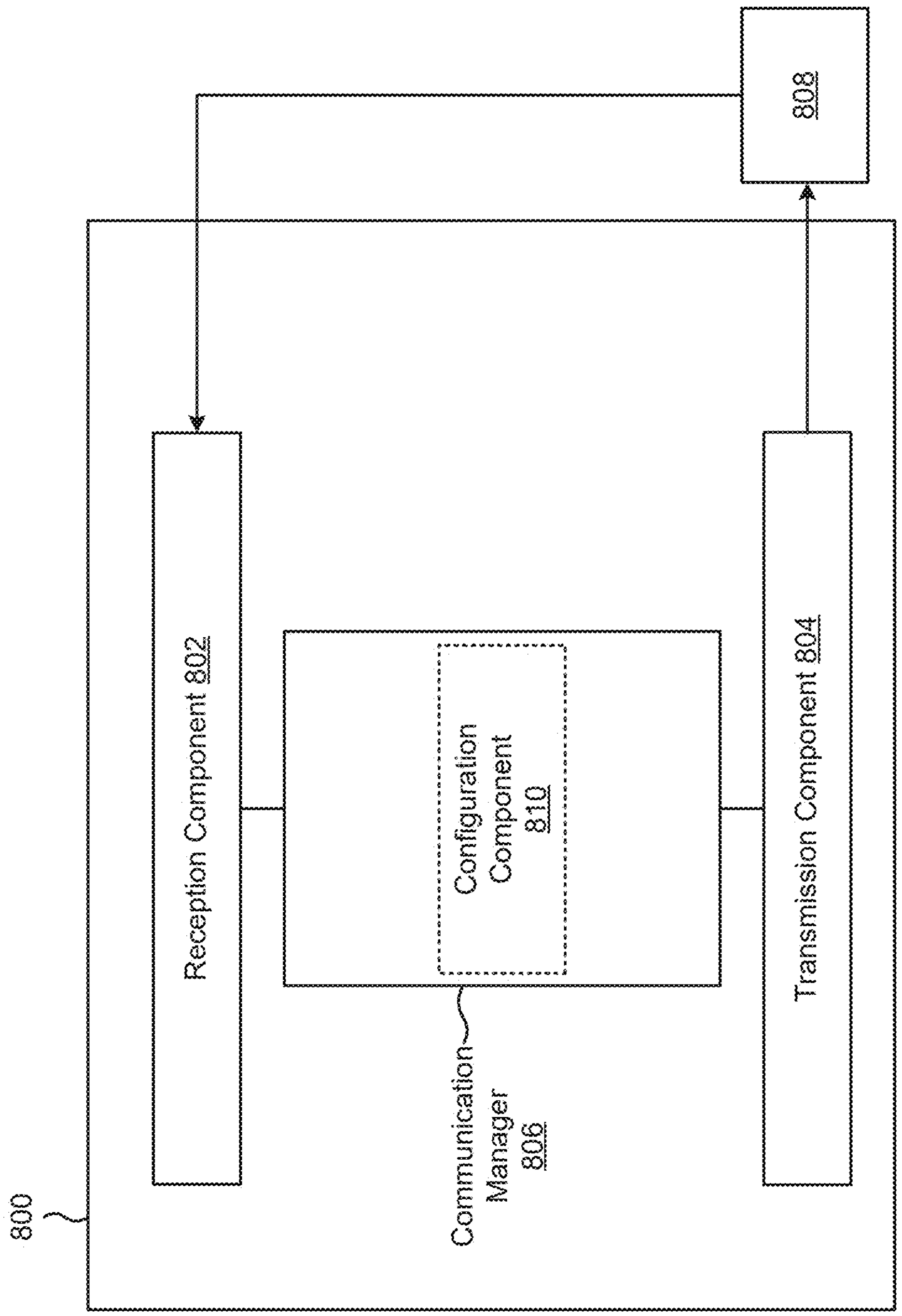
FIG. 8 is a diagram of an example apparatus for wireless communication that supports wireless communications.

FIG. 8 is a diagram of an example apparatus 800 for wireless communication that supports wireless communications. The apparatus 800 may be a network node, or a network node may include the apparatus 800. In some aspects, the apparatus 800 includes a reception component 802, a transmission component 804, and a communication manager 806, which may be in communication with one another (for example, via one or more buses). As shown, the apparatus 800 may communicate with another apparatus 808 (such as a UE 120, a network node 110, or another wireless communication device) using the reception component 802 and the transmission component 804. The communication manager 806 may be included in, or implemented via, a processing system (for example, the processing system 145). In some aspects, the communication manager 806 is the communication manager 155.

In some aspects, the apparatus 800 may be configured to or operable to perform one or more operations described herein in connection with FIG. 4. Additionally or alternatively, the apparatus 800 may be configured to or operable to perform one or more processes described herein, such as process 600 of FIG. 6.

The reception component 802 may receive communications, such as reference signals, control information, or data communications, from the apparatus 808. The reception component 802 may provide received communications to one or more other components of the apparatus 800, such as the communication manager 806. In some aspects, the reception component 802 may perform signal processing on the received communications, and may provide the processed signals to the one or more other components in a similar manner as described above in connection with FIG. 1. In some aspects, the reception component 802 may include one or more components of the network node described above in connection with FIG. 1, such as a radio, one or more RF chains, one or more transceivers, or one or more modems, each of which may in turn be coupled with one or more antennas of the network node.

The transmission component 804 may transmit communications, such as reference signals, control information, or data communications, to the apparatus 808. In some aspects, the communication manager 806 may generate communications and may transmit the generated communications to the transmission component 804 for transmission to the apparatus 808. In some aspects, the transmission component 804 may perform signal processing on the generated communications, and may transmit the processed signals to the apparatus 808 in a similar manner as described above in connection with FIG. 1. In some aspects, the transmission component 804 may include one or more components of the network node described above in connection with FIG. 1, such as a radio, one or more RF chains, one or more transceivers, or one or more modems, each of which may in turn be coupled with one or more antennas of the network node. In some aspects, the transmission component 804 may be co-located with the reception component 802.

The communication manager 806 may transmit or may cause the transmission component 804 to transmit, to a UE, configuration information that indicates to communicate in accordance with a frame periodicity of ninety milliseconds and in accordance with a quantity of system frame numbers that is a multiple of nine and that is less than one thousand and twenty-four. The communication manager 806 may communicate in accordance with the configuration information. In some aspects, the communication manager 806 may perform one or more operations described elsewhere herein as being performed by one or more components of the communication manager 806.

In some aspects, the communication manager 806 includes a set of components, such as a configuration component 810. Alternatively, the set of components may be separate and distinct from the communication manager 806. As used herein, the term "component" is intended to be broadly construed as hardware or a combination of hardware and at least one of software or firmware. In some aspects, one or more components of the set of components may include or may be implemented within a processing system (for example, the processing system 145). Additionally or alternatively, one or more components of the set of components may be implemented at least in part as software stored in one or more memories (for example, the memory described with reference to FIG. 1). For example, a component (or a portion of a component) may be implemented as instructions or code stored in a non-transitory computer-readable medium and executable by the processing system to perform the functions or operations of the component.

The transmission component 804 or the configuration component 810 may transmit, to a UE, configuration information that indicates to communicate in accordance with a frame periodicity of ninety milliseconds and in accordance with a quantity of system frame numbers that is a multiple of nine and that is less than one thousand and twenty-four. The reception component 802 or the transmission component 804 may communicate in accordance with the configuration information.

The quantity and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

The following provides an overview of some Aspects of the present disclosure:

Aspect 1: A method for wireless communication by a user equipment (UE), comprising: receiving configuration information that indicates to communicate in accordance with a frame periodicity of ninety milliseconds and in accordance with a quantity of system frame numbers that is a multiple of nine and that is less than one thousand and twenty-four; and communicating in accordance with the configuration information.

Aspect 2: The method of Aspect 1, wherein the quantity of system frame numbers is a quantity of hyper system frame numbers.

Aspect 3: The method of any of Aspects 1-2, wherein the configuration information is associated with narrowband Internet of Things communications.

Aspect 4: The method of any of Aspects 1-3, wherein the configuration information is associated with non-terrestrial network node frequency-division duplexing communications, wherein an uplink carrier is configured to be a same carrier as a downlink carrier.

Aspect 5: The method of any of Aspects 1-4, wherein the configuration information is included in a system information block.

Aspect 6: The method of any of Aspects 1-5, wherein the quantity of system frame numbers is nine hundred and ninety hyper system frame numbers.

Aspect 7: The method of Aspect 6, wherein thirty four system frame numbers that occur after the nine hundred and ninety system frame numbers are unused system frame numbers.

Aspect 8: The method of any of Aspects 1-7, wherein the configuration information indicates that a discontinuous reception cycle of the UE is to have a duration that is in accordance with the quantity of system frame numbers.

Aspect 9: The method of Aspect 8, wherein the duration of the discontinuous reception cycle of the UE is less than another duration associated with the quantity of system frame numbers and a quantity of unused system frame numbers.

Aspect 10: The method of any of Aspects 1-9, further comprising transmitting, in accordance with the configuration information, a request for a discontinuous reception cycle having a duration that is less than or equal to another duration associated with the quantity of system frame numbers.

Aspect 11: The method of any of Aspects 1-10, wherein the configuration information indicates that system information communications are to be scheduled in accordance with the quantity of system frame numbers.

Aspect 12: The method of Aspect 11, wherein the configuration information indicates that a system information modification boundary is to be scheduled in accordance with the quantity of system frame numbers.

Aspect 13: The method of Aspect 11, wherein the configuration information indicates that a system information modification boundary is to occur in accordance with a periodicity of three or more hyper system frame numbers.

Aspect 14: The method of Aspect 11, wherein the configuration information indicates that a system information modification boundary is to occur in accordance with a periodicity of five or more hyper system frame numbers.

Aspect 15: The method of any of Aspects 1-14, wherein the configuration information indicates that multicast control channel communications are to be scheduled in accordance with the quantity of system frame numbers.

Aspect 16: The method of Aspect 15, wherein the configuration information indicates that a multicast control channel modification boundary is to occur in accordance with a periodicity of three or more hyper system frame numbers.

Aspect 17: The method of Aspect 15, wherein the configuration information indicates that a multicast control channel modification boundary is to occur in accordance with a periodicity of five or more hyper system frame numbers.

Aspect 18: The method of any of Aspects 1-17, wherein the configuration information indicates that preconfigured uplink resource communications are to be scheduled in accordance with the quantity of system frame numbers.

Aspect 19: The method of Aspect 18, wherein the configuration information indicates that a preconfigured uplink resource modification boundary is to occur in accordance with a periodicity of three or more hyper system frame numbers.

Aspect 20: The method of Aspect 18, wherein the configuration information indicates that a preconfigured uplink resource modification boundary is to occur in accordance with a periodicity of five or more hyper system frame numbers.

Aspect 21: The method of any of Aspects 1-20, wherein the configuration information indicates that at least one of a system information periodicity, a modification period coefficient, or a paging cycle is to be scheduled in accordance with the quantity of system frame numbers.

Aspect 22: A method for wireless communication by a network node, comprising: transmitting, to a user equipment (UE), configuration information that indicates to communicate in accordance with a frame periodicity of ninety milliseconds and in accordance with a quantity of system frame numbers that is a multiple of nine and that is less than one thousand and twenty-four; and communicating in accordance with the configuration information.

Aspect 23: The method of Aspect 22, wherein the quantity of system frame numbers is a quantity of hyper system frame numbers.

Aspect 24: The method of any of Aspects 22-23, wherein the configuration information is associated with narrowband Internet of Things communications.

Aspect 25: The method of any of Aspects 22-24, wherein the configuration information is associated with non-terrestrial network node frequency-division duplexing communications, wherein an uplink carrier is configured to be a same carrier as a downlink carrier.

Aspect 26: The method of any of Aspects 22-25, wherein the configuration information is included in a system information block.

Aspect 27: The method of any of Aspects 22-26, wherein the quantity of system frame numbers is nine hundred and ninety hyper system frame numbers.

Aspect 28: The method of Aspect 27, wherein thirty four system frame numbers that occur after the nine hundred and ninety system frame numbers are unused system frame numbers.

Aspect 29: The method of any of Aspects 22-28, wherein the configuration information indicates that a discontinuous reception cycle of the UE is to have a duration that is in accordance with the quantity of system frame numbers.

Aspect 30: The method of Aspect 29, wherein the duration of the discontinuous reception cycle of the UE is less than another duration associated with the quantity of system frame numbers and a quantity of unused system frame numbers.

Aspect 31: The method of any of Aspects 22-30, further comprising receiving, in accordance with the configuration information, a request for a discontinuous reception cycle having a duration that is less than or equal to another duration associated with the quantity of system frame numbers.

Aspect 32: The method of any of Aspects 22-31, wherein the configuration information indicates that system information communications are to be scheduled in accordance with the quantity of system frame numbers.

Aspect 33: The method of Aspect 32, wherein the configuration information indicates that a system information modification boundary is to be scheduled in accordance with the quantity of system frame numbers.

Aspect 34: The method of Aspect 32, wherein the configuration information indicates that a system information modification boundary is to occur in accordance with a periodicity of three or more hyper system frame numbers.

Aspect 35: The method of Aspect 32, wherein the configuration information indicates that a system information modification boundary is to occur in accordance with a periodicity of five or more hyper system frame numbers.

Aspect 36: The method of any of Aspects 22-35, wherein the configuration information indicates that multicast control channel communications are to be scheduled in accordance with the quantity of system frame numbers.

Aspect 37: The method of Aspect 36, wherein the configuration information indicates that a multicast control channel modification boundary is to occur in accordance with a periodicity of three or more hyper system frame numbers.

Aspect 38: The method of Aspect 36, wherein the configuration information indicates that a multicast control channel modification boundary is to occur in accordance with a periodicity of five or more hyper system frame numbers.

Aspect 39: The method of any of Aspects 22-38, wherein the configuration information indicates that preconfigured uplink resource communications are to be scheduled in accordance with the quantity of system frame numbers.

Aspect 40: The method of Aspect 39, wherein the configuration information indicates that a preconfigured uplink resource modification boundary is to occur in accordance with a periodicity of three or more hyper system frame numbers.

Aspect 41: The method of Aspect 39, wherein the configuration information indicates that a preconfigured uplink resource modification boundary is to occur in accordance with a periodicity of five or more hyper system frame numbers.

Aspect 42: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-41.

Aspect 43: An apparatus for wireless communication at a device, the apparatus comprising one or more memories and one or more processors coupled to the one or more memories, the one or more processors configured to cause the device to perform the method of one or more of Aspects 1-41.

Aspect 44: An apparatus for wireless communication, the apparatus comprising at least one means for performing the method of one or more of Aspects 1-41.

Aspect 45: A non-transitory computer-readable medium storing code for wireless communication, the code comprising instructions executable by one or more processors to perform the method of one or more of Aspects 1-41.

Aspect 46: A non-transitory computer-readable medium storing a set of instructions for wireless communication, the set of instructions comprising one or more instructions that, when executed by one or more processors of a device, cause the device to perform the method of one or more of Aspects 1-41.

Aspect 47: A device for wireless communication, the device comprising a processing system that includes one or more processors and one or more memories coupled with the one or more processors, the processing system configured to cause the device to perform the method of one or more of Aspects 1-41.

Aspect 48: An apparatus for wireless communication at a device, the apparatus comprising one or more memories and one or more processors coupled to the one or more memories, the one or more processors individually or collectively configured to cause the device to perform the method of one or more of Aspects 1-41.

Aspect 49: A device comprising a processing system that includes one or more processors and one or more code-storing memories coupled with the one or more processors, the processing system configured to cause the device to perform the method of one or more of Aspects 1-41.

Aspect 50: A device comprising a processing system that includes processor circuitry and code-storing memory circuitry, the processing system configured to cause the device to perform the method of one or more of Aspects 1-41.

The foregoing disclosure provides illustration and description but is not intended to be exhaustive or to limit the aspects to the precise forms disclosed. Modifications and variations may be made in light of the above disclosure or may be acquired from practice of the aspects. No element, act, or instruction described herein should be construed as critical or essential unless explicitly described as such.

It will be apparent that systems or methods described herein may be implemented in different forms of hardware or a combination of hardware and software. The actual specialized control hardware or software used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, the articles "a" and "an" are intended to refer to one or more items and may be used interchangeably with "one or more" or "at least one." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or "a single one" or similar language is used. Also, as used herein, the terms "has," "have," "having," "comprise," "comprising," "include" and "including," and derivatives thereof or similar terms are intended to be open-ended terms that do not limit an element that they modify (for example, an element "having" A may also have B). Also, as used herein, the term "or" is intended to be inclusive when used in a series and may be used interchangeably with "and/or," unless explicitly stated otherwise (for example, if used in combination with "either" or "only one of"). As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

As used herein, the term "determine" or "determining" encompasses a wide variety of actions and, therefore, "determining" can include calculating, computing, processing, deriving, estimating, investigating, looking up (such as via looking up in a table, a database, or another data structure), searching, inferring, ascertaining, or measuring, among other possibilities. Also, "determining" can include receiving (such as receiving information), accessing (such as accessing data stored in memory) or transmitting (such as transmitting information), among other possibilities. Additionally, "determining" can include resolving, selecting, obtaining, choosing, establishing, or other such similar actions.

As used herein, the phrase "based on" is intended to mean "based at least in part on" or "based on or otherwise in association with" unless explicitly stated otherwise. As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the scope of all aspects described herein. Many of these features may be combined in ways not specifically recited in the claims or disclosed in the specification. The disclosure of various aspects includes each dependent claim in combination with every other claim in the claim set.

What is claimed is:

1. A user equipment (UE) for wireless communication, comprising:

a processing system that includes one or more processors and one or more memories coupled with the one or more processors, the processing system configured to cause the UE to:

receive configuration information that indicates to communicate in accordance with a frame periodicity of ninety milliseconds and in accordance with a quantity of system frame numbers that is a multiple of nine and that is less than one thousand and twenty-four; and communicate in accordance with the configuration information.

2. The UE of claim 1, wherein the quantity of system frame numbers is a quantity of hyper system frame numbers.

3. The UE of claim 1, wherein the configuration information is associated with narrowband Internet of Things communications.

4. The UE of claim 1, wherein the configuration information is associated with non-terrestrial network node frequency-division duplexing communications, wherein an uplink carrier is configured to be a same carrier as a downlink carrier.

5. The UE of claim 1, wherein the configuration information is included in a system information block.

6. The UE of claim 1, wherein the quantity of system frame numbers is nine hundred and ninety hyper system frame numbers.

7. The UE of claim 6, wherein thirty four system frame numbers that occur after the nine hundred and ninety system frame numbers are unused system frame numbers.

8. The UE of claim 1, wherein the configuration information indicates that a discontinuous reception cycle of the UE is to have a duration that is in accordance with the quantity of system frame numbers.

9. The UE of claim 8, wherein the duration of the discontinuous reception cycle of the UE is less than another duration associated with the quantity of system frame numbers and a quantity of unused system frame numbers.

10. The UE of claim 1, wherein the processing system is configured to cause the UE to transmit a request for a discontinuous reception cycle having a duration that is less than or equal to another duration associated with the quantity of system frame numbers.

11. The UE of claim 1, wherein the configuration information indicates that system information communications are to be scheduled in accordance with the quantity of system frame numbers.

12. The UE of claim 11, wherein the configuration information indicates that a system information modification boundary is to be scheduled in accordance with the quantity of system frame numbers.

13. The UE of claim 11, wherein the one or more processors are further configured to cause the UE to occur in accordance with a periodicity of three hyper system frame numbers, a multiple of three hyper system frame numbers, five hyper system frame numbers, or a multiple of five hyper system frame numbers.

14. The UE of claim 1, wherein the configuration information indicates that multicast control channel communications are to be scheduled in accordance with the quantity of system frame numbers.

15. The UE of claim 14, wherein the one or more processors are further configured to cause the UE to occur in accordance with a periodicity of three hyper system frame numbers, a multiple of three hyper system frame numbers, five hyper system frame numbers, or a multiple of five hyper system frame numbers.

16. The UE of claim 1, wherein the configuration information indicates that preconfigured uplink resource communications are to be scheduled in accordance with the quantity of system frame numbers.

17. The UE of claim 16, wherein the one or more processors are further configured to cause the UE to occur in accordance with a periodicity of three hyper system frame numbers, a multiple of three hyper system frame numbers, five hyper system frame numbers, or a multiple of five hyper system frame numbers.

18. The UE of claim 1, wherein the configuration information indicates that at least one of a system information periodicity, a modification period coefficient, or a paging cycle is to be scheduled in accordance with the quantity of system frame numbers.

19. A network node for wireless communication, comprising:

a processing system that includes one or more processors and one or more memories coupled with the one or more processors, the processing system configured to cause the network node to:

transmit, to a user equipment (UE), configuration information that indicates to communicate in accordance with a frame periodicity of ninety milliseconds and in accordance with a quantity of system frame numbers that is a multiple of nine and that is less than one thousand and twenty-four; and communicate in accordance with the configuration information.

20. A method for wireless communication by a user equipment (UE), comprising:

receiving configuration information that indicates to communicate in accordance with a frame periodicity of ninety milliseconds and in accordance with a quantity of system frame numbers that is a multiple of nine and that is less than one thousand and twenty-four; and communicating in accordance with the configuration information.

* * * * *